(12) United States Patent
Musco

(10) Patent No.: US 12,708,125 B1
(45) Date of Patent: Aug. 18, 2026

(54) BEVERAGE STRIP FOR DISSOLVING IN LIQUID AND METHODS OF USE AND MANUFACTURING THEREOF

(71) Applicant: Olyxir LLC, Livermore, CA (US)

(72) Inventor: Josephine Musco, Livermore, CA (US)

(73) Assignee: Olyxir LLC, Livermore, CA (US)

( * ) Notice: Subject to any disclaimer, the term of this patent is extended or adjusted under 35 U.S.C. 154(b) by 0 days.

(21) Appl. No.: 19/080,055

(22) Filed: Mar. 14, 2025

(51) Int. Cl.
*A23L 2/395* (2006.01)
*A23L 2/56* (2006.01)
*A23L 2/60* (2006.01)

(52) U.S. Cl.
CPC ................. *A23L 2/395* (2013.01); *A23L 2/56* (2013.01); *A23L 2/60* (2013.01)

(58) Field of Classification Search
CPC .......... A23L 27/79; A23L 2/395; A23L 19/05; A23L 2/56; A23L 2/60; A23F 3/30; A23F 3/14; A23F 3/32; A23F 3/34; A61K 9/072
USPC ........................... 426/72, 648, 655, 285, 590
See application file for complete search history.

(56) References Cited

U.S. PATENT DOCUMENTS

2004/0096569 A1* 5/2004 Barkalow ............... A23L 27/79 426/660
2005/0019448 A1* 1/2005 Engelhardt ............... A23L 2/56 426/89
2006/0039958 A1* 2/2006 Fuisz ..................... A61K 8/891 264/129
2007/0184172 A1* 8/2007 Timmerman ........... A23L 27/79 426/594
2020/0017265 A1* 1/2020 Loftis, Jr. ................. A23L 2/52

* cited by examiner

*Primary Examiner* — Jennifer McNeil
(74) *Attorney, Agent, or Firm* — CALDWELL LLC

(57) ABSTRACT

Beverage strip for dissolving in liquid and methods of use and manufacturing thereof. The apparatus includes a base matrix layer comprising a water-soluble substrate film, wherein the water-soluble substrate film coats an outer layer of the base matrix layer, the base matrix layer configured to provide structural integrity in a dry state and dissolve upon contact with a liquid medium, and a functional layer positioned on or within the base matrix layer, wherein the functional layer comprises a plurality of embedded substances, wherein the plurality of embedded substances are designed to release upon dissolution of the base matrix layer and deliver the plurality of embedded substances into the liquid medium for consumption.

17 Claims, 6 Drawing Sheets

304
312
300
Beverage Strips
308

BEVERAGE STRIP FOR DISSOLVING IN LIQUID AND METHODS OF USE AND MANUFACTURING THEREOF

FIELD OF THE INVENTION

The present invention generally relates to the field of consumables. In particular, the present invention is directed to a beverage strip for dissolving in liquid and methods of use and manufacturing thereof.

BACKGROUND

Traditional tea bag formulations often incorporate non-consumable materials such as paper, plastic, and synthetic fibers, which can lead to waste, potential health concerns, and unwanted residues in the brewed beverage. Additionally, existing methods of flavor and nutrient infusion rely on these non-dissolvable materials, limiting the efficiency of ingredient release and reducing the overall purity and convenience of the beverage preparation process.

SUMMARY OF THE DISCLOSURE

In an aspect, a beverage strip for dissolving in liquid includes at least a base matrix layer comprising a water-soluble substrate film, wherein the water-soluble substrate film coats an outer layer of the base matrix layer, the base matrix layer configured to provide structural integrity in a dry state and dissolve upon contact with a liquid medium, a functional layer positioned on or within the base matrix layer, wherein the functional layer comprises a plurality of embedded substances, wherein the plurality of embedded substances are designed to release upon dissolution of the base matrix layer and deliver the plurality of embedded substances into the liquid medium for consumption.

In another aspect, a method for manufacturing a beverage strip, wherein the method comprises preparing a base matrix layer comprising a water-soluble substrate film, wherein the base matrix layer is configured to provide structural integrity in a dry state and dissolve upon contact with a liquid medium, wherein preparing the base matrix comprises coating, using a water-soluble substrate film, an outer layer of the base matrix layer and blending a flexible network into the base matrix, preparing a functional layer positioned on or within the base matrix layer, wherein preparing the functional layer comprises embedding a plurality of embedded substances into the functional layer, wherein the embedded substances are designed to release upon dissolution of the base matrix layer, and deliver the plurality of embedded substances into a liquid medium for consumption, and dispersing the functional layer on or within the base matrix layer.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for dissolving in liquid and consumption. The apparatus includes a base matrix layer comprising a water-soluble substrate film, wherein the water-soluble substrate film coats an outer layer of the base matrix layer, the base matrix layer configured to provide structural integrity in a dry state and dissolve upon contact with a liquid medium and a functional layer positioned on or within the base matrix layer, wherein the functional layer comprises a plurality of embedded substances, wherein the plurality of embedded substances are designed to release upon dissolution of the base matrix layer and deliver the plurality of embedded substances into the liquid medium for consumption.

Figure 1A:
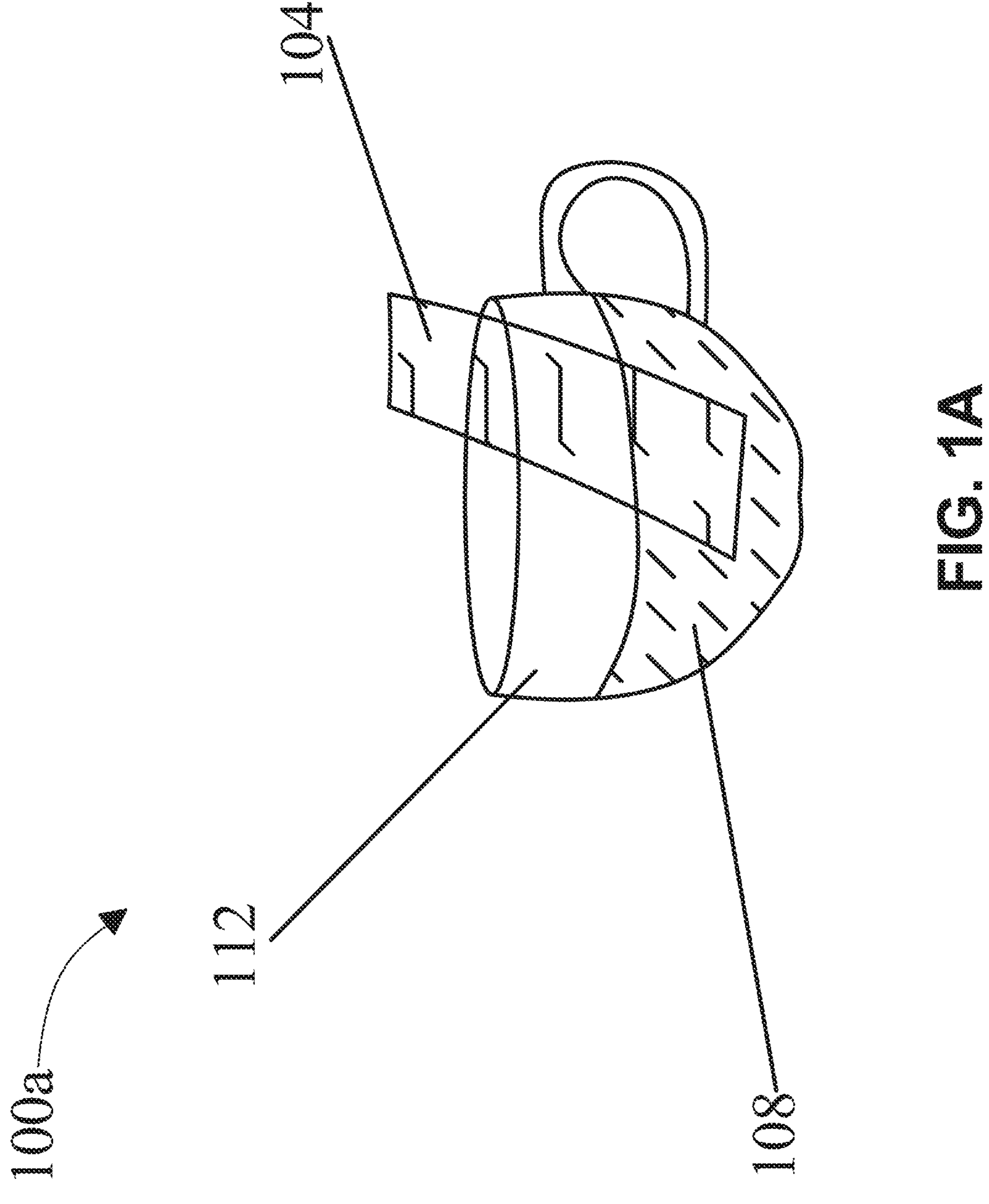
FIG. 1A is an exemplary embodiment of a beverage strip being dissolved in a liquid medium.
Figure 1B:
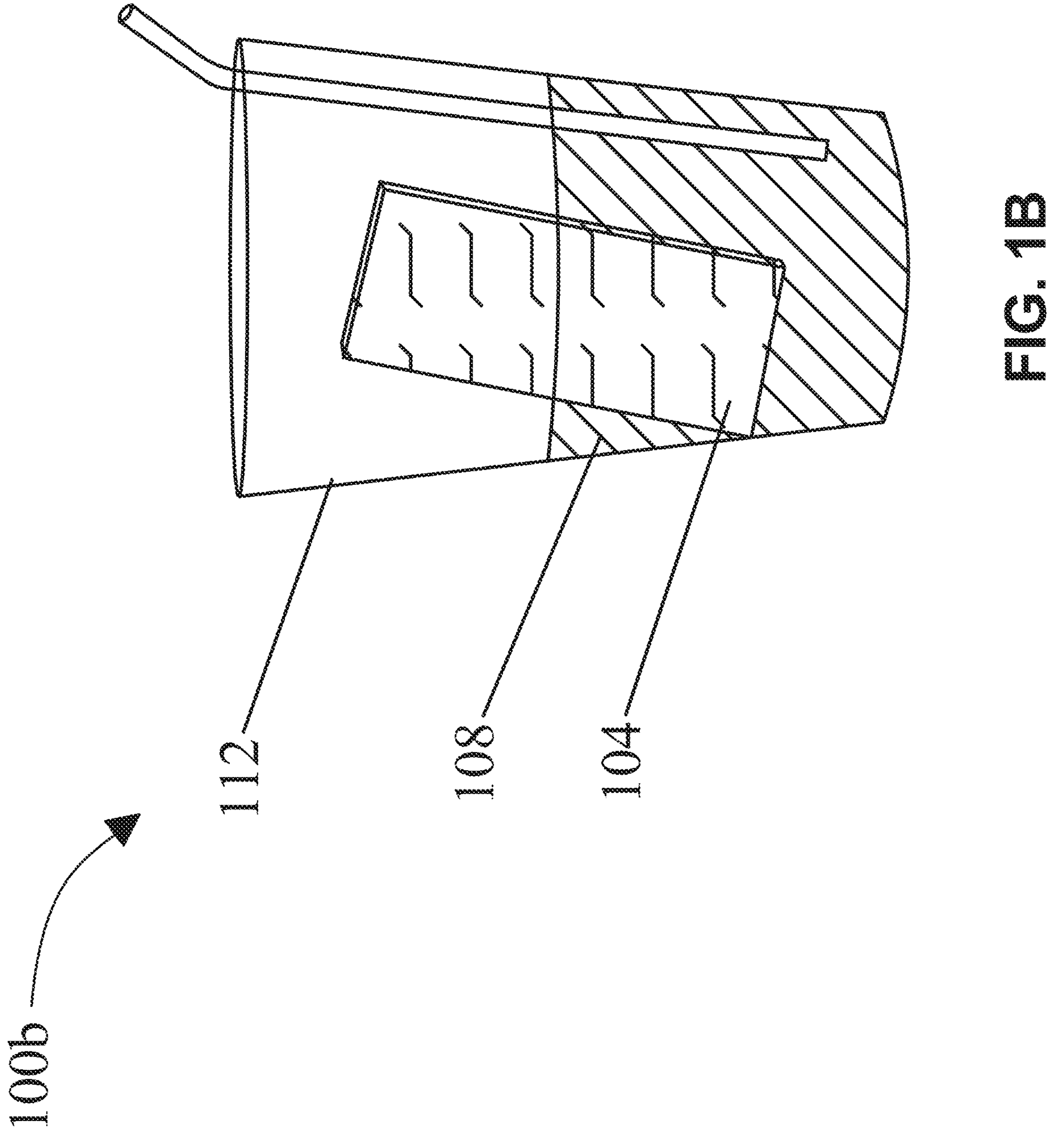
FIG. 1B is an exemplary embodiment of a beverage strip being dissolved in a liquid medium.

Referring now to FIGS. 1A-1B, an exemplary embodiment of apparatus 100*a-b* for dissolving in liquid and consumption is illustrated. Apparatus 100*a-b* may include a base matrix layer comprising a water-soluble substrate film, wherein the water-soluble substrate film coats an outer layer of the base matrix layer, the base matrix layer configured to provide structural integrity in a dry state and dissolve upon contact with a liquid medium 108. As used in this disclosure, a "base matrix" is a structural layer of a composition that provides physical support. In an embodiment, the base matrix may be configured to retain embedded substances and/or facilitate controlled dissolution or release. In an embodiment, the base matrix may include a polymeric or hydrocolloid network that maintains the structural form of a consumable strip before exposure to a liquid. For example, without limitation, the base matrix may be formed from materials such as gelatin, pectin, starch, alginate, and the like, allowing the strip to remain intact in a dry form but dissolve when submerged in a liquid. In another embodiment, the base matrix may include sugar alcohols such as xylitol or sorbitol, providing both structure and a mild sweetness while maintaining solubility.

With continued reference to FIGS. 1A-1B, as used in this disclosure, a "water-soluble substrate film" is a dissolvable layer composed of a material capable of disintegrating upon contact with a liquid medium. In an embodiment, the liquid medium 108 may include water and others as described herein. In an embodiment, the water-soluble substrate film may encapsulate, coat, and/or integrate with other layers to facilitate controlled dissolution. In an embodiment, the water-soluble substrate film may include polymeric materials such as polyvinyl alcohol (PVA), methylcellulose, hydroxypropyl methylcellulose (HPMC), and the like, which may dissolve efficiently in water-based environments. For example, without limitation, the water-soluble substrate film composed of starch derivatives may be used in beverage strips 104 to ensure complete dissolution without leaving residue. In another embodiment, the water-soluble substrate film may include an edible film made from pullulan may be used to create a seamless, flavor-enhancing layer that dissolves quickly when stirred into hot or cold beverages. As used in this disclosure, an "outer layer" is the external surface or coating of a composition. In an embodiment, the outer layer may provide a protective barrier, structural reinforcement, and/or functional integration with other materials. In an embodiment, the outer layer may consist of a thin coating of water-soluble substrate film that encases a functional core, ensuring stability and delayed release upon immersion in liquid. For example, without limitation, the beverage strip 104 may have an outer layer made of alginate that protects embedded nutrients from premature degradation while allowing rapid dissolution in water. In another embodiment, the outer layer may be infused with essential oils or flavor extracts, providing an immediate burst of taste upon contact with the liquid medium 108. As used in this disclosure, a "dry state" is a condition in which a material remains solid and structurally intact in the absence of significant moisture. In an embodiment, the dry state may include a condition wherein the material retains its composition until exposed to a liquid medium 108. In an embodiment, the dry state may include to the beverage strip 104 that is consumable that remains firm and portable before being submerged in the liquid medium 108. For example, without limitation, the beverage strip 104 composed of hydrocolloids such as carrageenan and guar gum may maintain a flexible but solid form when stored in a dry environment. In another embodiment, the dry state may allow for extended shelf life by preventing premature degradation of active ingredients, such as probiotics or vitamins, until consumption. As used in this disclosure, a "liquid medium" is a fluid substance that facilitates the dissolution of a material. In an embodiment, the liquid medium 108 enables the controlled release of embedded substances. In an embodiment, the liquid medium 108 may be water, tea, coffee, juice, and the like, wherein the beverage strip 104 dissolves completely to release flavors, nutrients, and/or bioactives. For example, without limitation, a tea-flavored dissolvable strip may be designed to disperse in a container 112 of hot water to create an instant brewed effect. In another embodiment, a functional beverage strip 104 containing electrolytes may dissolve in the container 112 which may include sports drinks or coconut water to enhance hydration and replenish essential minerals. In an embodiment, the liquid medium 108 may include a variety of beverages or fluids capable of dissolving the beverage strip 104 and facilitating the release of embedded substances. For example, without limitation, the liquid medium 108 may be hot or cold water, allowing the beverage strip 104 to dissolve and infuse flavors, nutrients, and/or functional ingredients into a neutral base. In another embodiment, the liquid medium 108 may be tea or coffee, wherein the beverage strip 104 dissolves to enhance the drink with additional flavors, sweeteners, or bioactives such as antioxidants or caffeine. The liquid medium 108 may also include fruit juices, such as orange juice, apple juice, cranberry juice, pomegranate juice, and the like, where the beverage strip 104 may introduce complementary flavors, vitamins, or probiotics. Additionally and or alternatively, the liquid medium 108 may be a dairy-based beverage, such as milk, almond milk, oat milk, or coconut milk, wherein the beverage strip 104 dissolves to infuse flavors like vanilla, chocolate, matcha, and the like, while incorporating added nutrients such as calcium or protein. In another embodiment, the liquid medium 108 may include carbonated beverages, such as sparkling water or soda, allowing the beverage strip 104 to dissolve while dispersing natural flavors, sweeteners, and/or functional ingredients like electrolytes or herbal extracts. The liquid medium 108 may further include fermented beverages, such as kombucha or kefir, wherein the strip introduces additional probiotics, prebiotics, botanical extracts and the like, to enhance gut health benefits. In another embodiment, the liquid medium 108 may include sports drinks, coconut water, or electrolyte-infused water, enabling the beverage strip 104 to dissolve and deliver hydration-supporting minerals, amino acids, or vitamins. Additionally and or alternatively, the liquid medium 108 may be an alcoholic beverage, such as wine, beer, or cocktails, where the beverage strip 104 dissolves to introduce natural flavors, bitters, or botanical infusions to enhance the drinking experience. In some embodiments, the base matrix layer may serve as the primary support structure, ensuring that the beverage strip 104 retains its form before use. The water-soluble substrate film coats the outer layer, protecting embedded substances and enabling controlled dissolution. When exposed to a liquid medium 108, such as water or tea, the base matrix layer dissolves, releasing flavors, nutrients, or bioactives into the liquid for consumption. For example, without limitation, the beverage strip 104 may have a base matrix layer formed from starch and agar, ensuring flexibility while maintaining a solid structure. The outer layer may be coated with the water-soluble substrate film of pullulan, allowing rapid dissolution upon immersion in tea or coffee. In another embodiment, the base matrix layer may contain a hydrocolloid network incorporating probiotics, while the outer layer provides an additional barrier to maintain stability until the strip dissolves in the liquid medium 108 such as juice, coconut water, and the like.

With continued reference to FIGS. 1A-1B, the water-soluble substrate film may include a polymeric or hydrocolloid-based film. As used in this disclosure, "polymeric material" is a material composed of repeating molecular units chemically bonded together to form a larger macromolecule. In an embodiment, the polymeric may exhibit flexibility, durability, and/or solubility characteristics. The polymeric material may include, but is not limited to, natural or synthetic polymers such as polysaccharides, proteins, polylactic acid (PLA), polyvinyl alcohol (PVA), or hydroxypropyl methylcellulose (HPMC), which can be engineered for controlled dissolution in various liquid media. As used in this disclosure, "hydrocolloid" is to a water-sensitive material composed of hydrophilic macromolecules. In an embodiment, the hydrocolloid material may be capable of forming gels, thickening solutions, and/or dissolving in liquid media. In an embodiment, the hydrophilic material may be derived from plant, microbial, synthetic sources, and the like. The hydrocolloid may include, but is not limited to, agar-agar, carrageenan, gellan gum, xanthan gum, pectin, alginate, gelatin, and the like, which may provide texture, stability, and/or controlled dissolution properties in consumable formulations. In an embodiment, the hydrocolloid-based film may be used to create the water-soluble substrate film that dissolves smoothly while delivering embedded substances into a beverage. For example, without limitation, the agar-agar may be used in the beverage strip 104 to maintain structural integrity while allowing for quick dissolution in hot liquids such as tea or coffee. In another embodiment, sodium alginate may be incorporated into the beverage strip 104 to create a slow-dissolving matrix for the controlled release of vitamins, probiotics, herbal extracts, and the like in functional beverages. In an embodiment, the polymeric material may be selected to create the water-soluble substrate film that maintains integrity in the dry state and dissolves efficiently when exposed to the liquid medium 108. For example, without limitation, polyvinyl alcohol (PVA) may be used in the beverage strip 104, ensuring structural support while allowing rapid dispersion in water. In another embodiment, hydroxypropyl methylcellulose (HPMC) may be used to regulate the dissolution rate, enabling the controlled release of flavors, nutrients, or bioactives when added to tea, coffee, juice, and the like. Without limitation, the polymeric film may be composed of synthetic or natural polymers such as polyvinyl alcohol (PVA), hydroxypropyl methylcellulose (HPMC), or pullulan, which provide stability in a dry state and rapid dissolution when immersed in water. Additionally and or alternatively, the hydrocolloid-based film may include agar-agar, carrageenan, gellan gum, xanthan gum, or pectin, offering unique dissolution characteristics such as gel formation, viscosity control, or gradual release of embedded ingredients. For example, without limitation, in an embodiment where the beverage strip 104 may be designed for hot drinks, a hydrocolloid-based film containing carrageenan or agar-agar may be used to ensure smooth dissolution and enhance the mouthfeel of the final beverage. In another embodiment, the polymeric film composed of HPMC or pullulan may be used to provide structural integrity in the dry state while allowing for immediate dispersion when added to cold beverages such as fruit juices, sports drinks, or flavored waters. Continuing, the selection of a polymeric or hydrocolloid-based film may be customized to control dissolution rates, improve ingredient stability, or enhance the sensory experience of the beverage.

With continued reference to FIGS. 1A-1B, the base matrix further may include a flexible network, wherein the flexile network is selected from the group consisting of xylitol, mannitol, polyvinyl alcohol, plasticizers, glycerin, sorbitol, polyethylene glycol, propylene glycol, gellan gum, agar-agar, carrageenan, lecithin, and combinations thereof. As used in this disclosure, a "flexible network" is a structural composition within a material that provides elasticity and mechanical resilience. In an embodiment, the flexible network may include a plasticizer Network. In an embodiment, the flexible network may enable controlled deformation, stability in the dry state, and dissolution upon interaction with the liquid medium 108. The flexible network may include, but is not limited to, polymeric, hydrocolloid, plasticizing compounds, and the like, that facilitate structural integrity while allowing for controlled breakdown or dispersion in a liquid environment. Xylitol is a sugar alcohol that functions as a humectant, sweetener, and structural component. In an embodiment, the xylitol may provide moisture retention, flexibility, and a cooling effect in consumable formulations. In an embodiment, xylitol may be incorporated into a flexible network to enhance dissolution properties while imparting sweetness to a beverage strip 104. Mannitol is a polyol with low hygroscopicity that contributes to structural stability and controlled dissolution. In an embodiment, the mannitol may provide a smooth texture and resistance to premature moisture absorption. In an embodiment, mannitol may be used to create a durable flexible network that dissolves in hot or cold beverages without excessive stickiness. Polyvinyl alcohol is a synthetic water-soluble polymer that provides film-forming properties, mechanical strength, and controlled dissolution. In an embodiment, the PVA may enhance the structural integrity of consumable films. In an embodiment, PVA may be incorporated into the flexible network to regulate the dissolution rate of the base matrix while ensuring it remains intact in a dry state. Plasticizers are compounds that reduce brittleness and improve flexibility in polymeric or hydrocolloid structures. In an embodiment, the plasticizers may enable enhanced elasticity, stretchability, and controlled mechanical properties. In an embodiment, a plasticizer such as glycerin or sorbitol may be included in the flexible network to create a softer, more pliable base matrix that dissolves efficiently in a liquid medium 108. Glycerin is a polyol that functions as a humectant and plasticizer. In an embodiment, the glycerin may retain moisture, enhances flexibility, and prevents the brittleness of consumable films. In an embodiment, glycerin may be used to ensure the base matrix remains pliable in dry storage while allowing smooth dissolution when introduced into a beverage. Sorbitol is a sugar alcohol with humectant and plasticizing properties. In an embodiment, sorbitol may contribute to the elasticity and moisture retention of a flexible network. In an embodiment, sorbitol may be combined with xylitol or glycerin to optimize the dissolution characteristics of the base matrix while maintaining structural stability. Polyethylene glycol is a water-soluble polymer that enhances solubility, plasticization, and moisture retention. In an embodiment, PEG may be used to modulate the mechanical properties and dissolution profile of the flexible network. In an embodiment, PEG may be added to adjust the flexibility of the base matrix while ensuring consistent dispersion in liquid. Propylene glycol is a solvent and humectant that aids in moisture retention and enhances the solubility of active ingredients. In an embodiment, propylene glycol may support the uniform distribution of functional components within a flexible network. In an embodiment, propylene glycol may be incorporated into a beverage strip 104 to maintain a smooth texture while controlling hydration properties. Gellan gum is a hydrocolloid that provides gel-forming and structural reinforcement properties. In an embodiment, gellan gum may contribute to controlled dissolution and viscosity regulation. In an embodiment, gellan gum may be incorporated into a flexible network to ensure structural integrity before dissolution while enabling smooth dispersion in liquid. Agar-agar is a natural polysaccharide derived from seaweed that forms a thermally stable gel. In an embodiment, agar-agar may enhance film flexibility and controlled release properties. In an embodiment, agar-agar may be used to improve the flexible network's mechanical strength and enable slow, uniform dissolution in beverages. Carrageenan is a hydrocolloid extracted from red seaweed that provides film-forming, gelling, and stabilizing properties. In an embodiment, the carrageenan may enhance the flexible network's elasticity and dissolution characteristics. In an embodiment, carrageenan may be used to support the base matrix while controlling the dispersion rate of the beverage strip 104 in liquid. Lecithin is an emulsifying and stabilizing agent that enhances film flexibility and ingredient dispersion. In an embodiment, the lecithin may contribute to the uniform integration of hydrophobic and hydrophilic components within the flexible network. In an embodiment, lecithin may be included to improve the stability of embedded substances while maintaining the base matrix's structural integrity before dissolution. In some embodiments, the flexible network may enhance the mechanical properties of the base matrix, ensuring structural stability in a dry state while allowing controlled dissolution in a liquid medium 108. For example, without limitation, the gellan gum and carrageenan may be incorporated to create a resilient yet dissolvable film that holds embedded substances until exposure to water. In another embodiment, polyvinyl alcohol (PVA) and polyethylene glycol (PEG) may be used to fine-tune the film's flexibility, enabling it to maintain integrity before dissolving evenly in a beverage. Additionally and or alternatively, humectants such as glycerin, sorbitol, and xylitol may be added to the flexible network to prevent brittleness and enhance moisture retention, ensuring that the base matrix remains pliable and does not crack or degrade prematurely. In an embodiment where the beverage strip 104 is designed for instant tea or coffee, lecithin and propylene glycol may be used to improve ingredient dispersion, ensuring uniform dissolution and flavor release when introduced into hot or cold liquids. In another embodiment, the flexible network may include a combination of plasticizers, hydrocolloids, and polyols, such as agar-agar, mannitol, and sorbitol, to create a well-balanced base matrix that supports embedded flavors, nutrients, or bioactives while dissolving at an optimized rate. The selection and ratio of these components may be adjusted based on the desired mechanical strength, dissolution profile, and sensory characteristics of the final beverage formulation.

With continued reference to FIGS. 1A-1B, the base matrix layer may include approximately 83.3% to 97.64% by weight of a total composition and the functional layer comprises approximately 2.36% to 16.7% by weight of the total composition. As used in this disclosure, a "total composition" is the complete formulation of a material. In an embodiment, the total composition represents the combined percentages of all individual components that make up a final structure. The total composition may include, but is not limited to, structural components, active ingredients, stabilizers, plasticizers, emulsifiers, and other elements that contribute to the overall functionality and performance of the material. In an embodiment, the total composition is expressed as a percentage, where the sum of all included components equals 100% by weight. In some embodiments, the base matrix layer may serve as the primary structural component of the beverage strip 104, providing mechanical integrity, controlled dissolution, and support for embedded substances. The base matrix layer may include a majority of the total composition, ensuring that the strip remains stable in the dry state while allowing for rapid dissolution upon contact with a liquid medium 108. The functional layer, which comprises a smaller percentage of the total composition, is designed to deliver embedded substances such as flavors, nutrients, bioactives, sweeteners, preservatives, and the like upon dissolution. For example, without limitation, in an embodiment where the beverage strip 104 is formulated for instant tea, the base matrix layer may comprise approximately 95% by weight of the total composition, composed of hydrocolloid-based materials such as agar-agar, carrageenan, and sorbitol, ensuring structural flexibility and solubility. The remaining 5% by weight of the total composition may form the functional layer, incorporating tea extracts, flavor enhancers, and antioxidants that dissolve into the beverage upon use. In another embodiment, a beverage strip 104 designed for electrolyte replenishment may have a base matrix layer comprising approximately 90% by weight of the total composition, consisting of polyvinyl alcohol (PVA), glycerin, and polyethylene glycol (PEG) for controlled dissolution. The functional layer, making up 10% by weight of the total composition, may include electrolytes such as potassium, sodium, and magnesium, along with flavoring agents like citrus extracts or berry concentrates. In another embodiment, a beverage strip 104 with nutrient-enhancements may have a base matrix layer comprising 85% by weight of the total composition, formulated with gellan gum, mannitol, and xylitol, while the functional layer makes up the remaining 15% by weight, embedding probiotics, vitamins, and botanical extracts such as ginger, turmeric, or matcha powder. The proportion of the base matrix layer to the functional layer may be adjusted based on the desired release profile, solubility characteristics, and ingredient stability within the total composition. As used in this disclosure, "approximately" indicates a measurement that is close to but not necessarily exactly equal to a specified number. In an embodiment, approximately accounts for minor variations due to tolerances, environmental conditions, or inherent measurement uncertainties. The range of approximation may depend on the context of the specification, system, or application, and may include acceptable deviations based on industry standards, material properties, or functional requirements. In an embodiment, the term approximately may account for slight variations in formulation due to ingredient processing tolerances, environmental conditions, or manufacturing adjustments. For example, without limitation, in the beverage strip 104 formulation, the base matrix layer may be targeted at 85% by weight of the total composition, but an acceptable range could be between 84.5% and 85.5% by weight depending on ingredient distribution and processing factors. Similarly, if a specific functional layer formulation aims for 3% by weight of the total composition, the actual percentage may range from 2.9% to 3.1% by weight due to minor variations in material blending or hydration levels.

In another embodiment, the beverage strip 104 designed for flavor infusion may have a base matrix layer composed of hydrocolloids such as carrageenan and agar-agar, making up approximately 90% by weight of the total composition, with a minor tolerance range of 89% to 91% by weight. The functional layer, containing tea extract and citrus oils, may be formulated at approximately 10% by weight of the total composition, with a practical range of 9% to 11% by weight, ensuring consistent ingredient delivery while accounting for slight variations in strip thickness and drying conditions. Additionally and or alternatively, the base matrix layer may be composed of polyvinyl alcohol (PVA) and glycerin, ensuring dissolution properties while forming approximately 95% by weight of the total composition. The functional layer, which includes electrolytes, vitamins, and herbal extracts, may be formulated at approximately 5% by weight, allowing for minor ingredient weight variations in a practical range of 4.8% to 5.2% by weight without significantly impacting performance.

Still referring to FIGS. 1A-1B, a functional layer positioned on or within the base matrix layer, wherein the functional layer comprises a plurality of embedded substances, wherein the plurality of embedded substances are designed to release upon dissolution of the base matrix layer and deliver the plurality of embedded substances into the liquid medium 108 for consumption. As used in this disclosure, a "functional layer" is a portion of a composition that contains active components. As used in this disclosure, "active components" are ingredients within the functional layer of a composition that provide a specific intended effect when the composition is consumed. The active components may include bioactive compounds, nutrients, pharmaceuticals, flavoring agents, or other substances that contribute to the performance, efficacy, or sensory experience of the composition. The active components may be designed for controlled release, rapid dissolution, or targeted absorption depending on the intended application of the composition. In an embodiment, the functional layer may be configured to release active or functional components upon dissolution and/or interaction with an external medium, such as the liquid medium 108. The functional layer may include, but is not limited to, flavoring agents, nutrients, bioactives, sweeteners, colorants, emulsifiers, preservatives, stabilizers, and the like, which may be incorporated to enhance sensory, nutritional, and/or therapeutic properties. In some embodiments, the functional layer may be embedded within, coated on, or dispersed throughout a base matrix layer, ensuring controlled release upon exposure to a liquid medium 108. As used in this disclosure, "embedded substances" are active components incorporated within a material. In an embodiment, the embedded substances may be designed for controlled release, dissolution, or interaction with an external environment. The embedded substances may include, but are not limited to, botanical extracts, vitamins, minerals, polyphenols, antioxidants, probiotics, amino acids, herbal infusions, or functional additives, which remain structurally integrated within the functional layer until the material dissolves or disperses. In some embodiments, the embedded substances may be microencapsulated, layered, or evenly distributed to optimize stability, solubility, and bioavailability. In some embodiments, the functional layer is structurally integrated within the base matrix layer, ensuring that the embedded substances remain stable until exposure to the liquid medium 108 such as water, tea, coffee, juice, and/or other consumable fluids. In an embodiment, the functional layer may be structurally integrated within the base matrix layer through lamination, coating, or embedding techniques, ensuring stability and controlled release upon exposure to a liquid medium. Lamination may involve bonding multiple layers together under heat and pressure, creating a multi-layered composition where the functional layer is sandwiched between protective base matrix layers. This method may enhance durability, prevent premature activation of active components, and enable precise layering of ingredients for targeted dissolution. In an embodiment, coating techniques may involve applying a thin layer of the functional composition onto the base matrix, either through spray drying, solvent casting, or electrostatic deposition. This approach may allow for uniform distribution of active components while maintaining flexibility and rapid dissolution upon contact with a liquid. The coating may be designed for immediate release or formulated as a controlled-release layer, depending on the intended effect of the active components. In an embodiment, embedding techniques may involve dispersing the functional layer within the base matrix, either as microencapsulated particles, dispersed inclusions, or an integrated composite structure. This may ensure that the active components are evenly distributed throughout the strip, allowing for gradual and consistent release upon dissolution. Embedding may also improve mechanical stability, preventing ingredient separation or degradation during storage and handling. In an embodiment, when the base matrix layer dissolves, the functional layer disintegrates, allowing the controlled release of flavors, nutrients, or bioactive compounds into the beverage. In an embodiment, the selection of embedded substances may vary depending on the desired sensory, nutritional, or therapeutic effects of the final beverage formulation. For example, without limitation, in an embodiment where the beverage strip 104 is formulated for instant tea, the functional layer may contain black tea extract, green tea extract, citrus oil, honey powder, and the like, ensuring a well-balanced infusion when added to hot water. The base matrix layer may consist of hydrocolloids such as carrageenan and agar-agar, allowing the strip to dissolve rapidly while evenly dispersing the tea compounds. In another embodiment, the beverage strip 104 may be designed for electrolyte replenishment may include a functional layer enriched with potassium, sodium, magnesium, vitamin C, and the like, may be formulated to dissolve in sports drinks, coconut water, infused water, and the like. The embedded substances may be microencapsulated within the functional layer, allowing for gradual release to optimize hydration over time. Continuing, the base matrix layer may be composed of polyvinyl alcohol (PVA) and glycerin, ensuring structural flexibility and smooth dissolution in both hot and cold beverages. In another embodiment, the functional layer in a wellness-focused beverage strip 104 may include probiotics, prebiotics, and/or botanical extracts such as turmeric, ginger, and elderberry, and may be designed for immune support and gut health. Continuing, the embedded substances may be combined with natural fruit concentrates, allowing for a flavorful yet functional release upon dissolution in kombucha, herbal tea, or fruit-infused water. Without limitation, the base matrix layer may contain xylitol, sorbitol, and alginate, ensuring optimal texture, stability, and dissolution rates while preserving the integrity of live probiotic cultures. Additionally and or alternatively, the functional layer may be tailored for personalized nutrition, wherein the embedded substances may include customized vitamins, amino acids, herbal extracts, and the like based on individual dietary needs. For example, without limitation, the beverage strip 104 for energy enhancement may contain L-theanine, caffeine, and B vitamins, ensuring rapid absorption when mixed with coffee or green tea. The base matrix layer in this embodiment may be designed for controlled dissolution, allowing for timed release of caffeine and amino acids to maintain sustained energy levels. In each of these embodiments, the functional layer serves as a targeted delivery system, ensuring that the embedded substances dissolve efficiently within the liquid medium 108 while maintaining stability, bioavailability, and sensory appeal. The integration of base matrix layers with functional layers may allow for optimized beverage formulations, enabling seamless infusion of flavors, nutrients, or active ingredients without requiring additional processing, stirring, or filtration.

With continued reference to FIGS. 1A-1B, the plurality of embedded substances comprises one or more flavoring agents selected from a group consisting of natural flavors, artificial flavors, essential oils, fruit extracts, spice extracts, herb extracts, vanilla extract, citrus oils, berry flavorings, chocolate flavoring, mint extract, kombucha extract, floral extracts, fermented fruit extracts, coffee cherry extract, coconut water concentrate, matcha powder, roasted barley extract, smoked paprika extract, yuzu zest extract, tamarind concentrate, rosemary extract, ginger extract, lemongrass extract, hibiscus extract, turmeric extract, black tea extract, green tea extract, guava puree, passion fruit concentrate, acai berry powder, elderflower extract, saffron extract, dragon fruit concentrate, pear essence, pomegranate concentrate, coconut extract, lime zest, apple cider vinegar, lemongrass oil, matcha extract, ginger root powder, smoked cinnamon, rose water, beetroot juice concentrate, mango puree, watermelon essence, hibiscus flower extract, cranberry extract, salted caramel flavoring, vanilla bean extract, and any combinations thereof. As used in this disclosure, "flavoring agents" are substances that impart the taste and/or aroma of a consumable product. In an embodiment, the flavoring agents may be derived from natural, artificial, synthetic source, and the like. Flavoring agents may include, but are not limited to, essential oils, fruit extracts, spice extracts, herb extracts, botanical distillates, sweeteners, acidulants, and aromatic compounds, which contribute to the sensory profile of a food or beverage. In some embodiments, flavoring agents may be incorporated into a functional layer of a beverage strip 104, ensuring controlled release upon dissolution in a liquid medium 108. For example, without limitation, in an embodiment, flavoring agents may include citrus oils, vanilla extract, and berry flavoring, providing a fruity and aromatic profile to a beverage strip 104 designed for tea or coffee enhancement. In another embodiment, spice extracts such as cinnamon, ginger, and turmeric may be included in a functional layer to introduce warm, earthy notes when dissolved in hot water or herbal tea. Additionally and or alternatively, flavoring agents such as tropical fruit extracts, coconut essence, and mint flavoring may be used to create a refreshing taste while complementing electrolyte ingredients.

With continued reference to FIGS. 1A-1B, plurality of embedded substances may include one or more nutrients selected from a group consisting of vitamins, minerals, amino acids, electrolytes, fiber, antioxidants, proteins, omega-3 fatty acids, carbohydrates, sugars, polyphenols, probiotics, prebiotics, enzymes, astaxanthin, coenzyme q10, curcumin, chlorophyll, hyaluronic acid, 1-carnitine, *spirulina*, collagen peptides, turmeric extract, resveratrol, and any combinations thereof. As used in this disclosure, "nutrients" are substances that provide essential or beneficial dietary components to support biological functions. In an embodiment, the nutrients may include macronutrients, micronutrients, and/or functional compounds that contribute to health and wellness. Nutrients may include, but are not limited to, vitamins, minerals, amino acids, electrolytes, fiber, antioxidants, proteins, omega-3 fatty acids, carbohydrates, and polyphenols, which may be incorporated into a functional layer of a beverage strip 104 to deliver dietary benefits upon dissolution in a liquid medium 108. For example, in an embodiment, the beverage strip 104 designed for hydration and recovery may include electrolytes such as sodium, potassium, and magnesium, ensuring replenishment of essential minerals lost through sweat. In another embodiment, a nutrient-enhanced beverage strip 104 may contain B vitamins, vitamin C, and zinc, supporting immune health when dissolved in tea, water, or juice. Additionally and/or alternatively, the beverage strip 104 for protein may include collagen peptides and essential amino acids embedded in the functional layer, providing support for muscle repair and skin health when mixed into smoothies or flavored water.

With continued reference to FIGS. 1A-1B, the plurality of embedded substances may include one or more bioactives selected from a group consisting of vitamins, minerals, amino acids, polyphenols, probiotics, omega-3 fatty acids, caffeine, herbal extracts, antioxidants, plant-based extracts, astaxanthin, spermidine, berberine, pterostilbene, L-theanine, *cordyceps*, saffron extract, corydalis extract, fucoxanthin, N-acetylcystein, GLP-1 receptor agonists, SGLT-2 inhibitors, beta-agonists, peptides, statins, and any combinations thereof. As used in this disclosure, "bioactives" are biologically active compounds that exert functional or therapeutic effects within the body. In an embodiment, the bioactives may include plant-derived, microbial, or synthetic compounds with antioxidant, anti-inflammatory, metabolic, or cognitive benefits. Bioactives may include, but are not limited to, polyphenols, probiotics, omega-3 fatty acids, herbal extracts, adaptogens, nootropics, and pharmacologically active peptides, which may be formulated in a functional layer of a beverage strip 104 for controlled release into a liquid medium 108. For example, without limitation, in an embodiment, the beverage strip 104 for wellness may include green tea catechins, curcumin, and resveratrol, providing antioxidant benefits when dissolved in hot water or herbal tea. In another embodiment, the beverage strip 104 for cognitive-enhancing may include L-theanine, caffeine, and *ginseng* extract, supporting mental focus and energy when mixed into coffee or matcha. Additionally and or alternatively, the beverage strip 104 for gut health-focus may include probiotics such as *Lactobacillus* and *Bifidobacterium*, along with prebiotic fibers may be embedded in the functional layer, ensuring optimal digestive support when dissolved in kombucha or yogurt-based drinks.

With continued reference to FIGS. 1A-1B, the plurality of embedded substances may include one or more preservatives selected from a group consisting of sodium benzoate, potassium sorbate, calcium propionate, citric acid, ascorbic acid, tocopherols, rosemary extract, lactic acid, nisin, grapefruit seed extract, elderberry extract, pomegranate extract, annatto extract, ferrous sulfate, natural plant-derived antimicrobials, chitosan, berberine, oregano oil, and any combinations thereof. As used in this disclosure, "preservatives" are substances that inhibit microbial growth, oxidation, or chemical degradation. In an embodiment, preservatives may extend the shelf life and ensure stability of consumable products by preventing spoilage, contamination, or nutrient loss. Preservatives may include, but are not limited to, organic acids, antioxidants, antimicrobial agents, chelating agents, and natural plant-derived antimicrobials, which may be incorporated into a functional layer or base matrix layer of a beverage strip 104 to maintain freshness and integrity. For example, without limitation, in an embodiment, the beverage strip 104 designed for longer shelf life may contain ascorbic acid (vitamin C) and tocopherols (vitamin E), which function as antioxidants to prevent oxidation of embedded substances. In another embodiment, a natural preservative system may include rosemary extract, citric acid, and grapefruit seed extract, ensuring microbial stability while maintaining a clean-label formulation for organic or wellness-focused beverages. Additionally and or alternatively, for the beverage strip 104 containing probiotics, lactic acid and nisin may be added to the functional layer, protecting the live probiotic cultures and ensuring their viability until the strip is dissolved in a liquid medium 108.

With continued reference to FIGS. 1A-1B, the plurality of embedded substances may include one or more sweeteners selected from a group consisting of sucrose, glucose, fructose, high fructose corn syrup, *stevia*, sucralose, aspartame, erythritol, xylitol, agave syrup, monk fruit extract, allulose, tagatose, yacon syrup, lucuma powder, and any combinations thereof. As used in this disclosure, "sweeteners" are substances that provide sweetness in a consumable. In an embodiment, the sweeteners may be derived from natural, artificial, plant-based sources, and the like. Sweeteners may include, but are not limited to, sucrose, glucose, fructose, high fructose corn syrup, *stevia*, sucralose, aspartame, erythritol, xylitol, agave syrup, monk fruit extract, allulose, tagatose, yacon syrup, and the like, which may be incorporated into a functional layer of a beverage strip 104 to enhance palatability without requiring additional sugar. For example, without limitation, in an embodiment, the beverage strip 104 with low-calories may include monk fruit extract and *stevia*, ensuring sweetness without affecting blood sugar levels when dissolved in tea or coffee. In another embodiment, the beverage strip 104 focused on hydration may contain allulose and erythritol, providing a natural-tasting sweetness without contributing excess calories when mixed into sports drinks or infused water. Additionally and or alternatively, for the beverage strip 104 designed for dessert-flavors may include agave syrup and coconut sugar may be used to enhance the richness of chocolate or vanilla-flavored infusions in milk or dairy alternatives.

With continued reference to FIGS. 1A-1B, the plurality of embedded substances may include one or more colorants selected from a group consisting of natural food colorants, artificial food colorants, beet juice powder, *spirulina* extract, turmeric powder, spinach powder, carrot juice powder, anthocyanins, black currant extract, matcha powder, chlorophyll, paprika extract, berry extracts, fruit concentrates, vegetable concentrates, pitaya extract, butterfly pea flower extract, red cabbage extract, moringa powder, hibiscus extract, saffron, black soybean powder, rose petal extract, cocoa powder, indigo powder, maqui berry extract, and any combinations thereof. As used in this disclosure, "colorants" are substances that modify the visual color of a consumable. In an embodiment, the colorants may be derived from natural, artificial, plant-based sources, and the like. Colorants may include, but are not limited to, beet juice powder, *spirulina* extract, turmeric powder, spinach powder, carrot juice powder, anthocyanins, black currant extract, matcha powder, chlorophyll, paprika extract, berry extracts, fruit concentrates, vegetable concentrates, pitaya extract, butterfly pea flower extract, red cabbage extract, moringa powder, hibiscus extract, saffron, black soybean powder, rose petal extract, cocoa powder, indigo powder, maqui berry extract, and any combinations thereof, which may be included in a base matrix layer or functional layer of a beverage strip 104 to improve aesthetic appeal. For example, without limitation, in an embodiment, the beverage strip 104 that is fruit-flavored may contain hibiscus extract and pomegranate concentrate, providing a deep red color when dissolved in water or juice. In another embodiment, the beverage strip 104 may be matcha-infused incorporate *spirulina* and chlorophyll, ensuring a rich green hue when blended into milk or dairy alternatives. Additionally and or alternatively, the beverage strip 104 may be a natural blue-colored by using a butterfly pea flower extract which may create a vibrant blue or purple transformation when mixed with citrus-based liquids.

With continued reference to FIGS. 1A-1B, the plurality of embedded substances may include one or more emulsifiers selected from a group consisting of lecithin, monoglycerides, diglycerides, polysorbates, sucrose esters, propylene glycol esters, xanthan gum, guar gum, sunflower lecithin, chitosan, acacia gum, milk protein concentrate, tapioca starch, *laminaria* extract, polyglycerol esters of fatty acids, and any combinations thereof. As used in this disclosure, "emulsifiers" are substances that promote the uniform dispersion of ingredients. In an embodiment, the emulsifiers may stabilize oil-water mixtures and improve texture, consistency, and ingredient compatibility. Emulsifiers may include, but are not limited to, lecithin, monoglycerides, diglycerides, polysorbates, sucrose esters, propylene glycol esters, xanthan gum, guar gum, sunflower lecithin, chitosan, acacia gum, milk protein concentrate, tapioca starch, *laminaria* extract, and polyglycerol esters of fatty acids, which may be incorporated into a functional layer of a beverage strip 104 to improve ingredient solubility and mouthfeel. For example, without limitation, in an embodiment, a creamy latte-flavored beverage strip 104 may contain sunflower lecithin and xanthan gum, ensuring smooth dispersion of coffee and milk extracts in hot water or dairy alternatives. In another embodiment, the beverage strip 104 designed to be chocolate-flavored may incorporate monoglycerides and diglycerides, allowing for even mixing of cocoa powder and sweeteners in milk-based drinks. Additionally and or alternatively, the beverage strip 104 designed to be nutrient-enriched, acacia gum and tapioca starch may be used to stabilize plant-based proteins, preventing separation when dissolved in smoothies or protein shakes.

With continued reference to FIGS. 1A-1B, the plurality of embedded substances may include one or more stabilizers selected from a group consisting of citric acid, ascorbic acid, tocopherols, xanthan gum, guar gum, sodium benzoate, calcium carbonate, pectin, tamarind gum, konjac flour, chitosan, beta-glucans, polydextrose, tannins, alginates, and combinations thereof. As used in this disclosure, "stabilizers" are substances that maintain the consistency, texture, or structural integrity of a formulation. In an embodiment, the stabilizers prevent ingredient separation, sedimentation, or degradation. Stabilizers may include, but are not limited to, citric acid, ascorbic acid, tocopherols, xanthan gum, guar gum, sodium benzoate, calcium carbonate, pectin, tamarind gum, konjac flour, chitosan, beta-glucans, polydextrose, tannins, and alginates, which may be incorporated into a functional layer or base matrix layer of a beverage strip 104 to enhance formulation stability. For example, without limitation, in an embodiment, the beverage strip 104 may contain pectin and xanthan gum, ensuring smooth texture and even dispersion when dissolved in water or juice. In another embodiment, the beverage strip 104 may incorporate ascorbic acid and tocopherols, providing antioxidant protection to prevent nutrient degradation before the strip dissolves in a liquid medium 108. Additionally and or alternatively, for the beverage strip 104, chitosan and beta-glucans may be included to stabilize the protein content, preventing clumping when mixed into dairy-free or smoothie-based beverages.

With continued reference to FIGS. 1A-1B, the plurality of embedded substances may include approximately 1-5% by weight of the flavoring agents, 0.5-3% by weight of the nutrients, 0.1-2% by weight of the bioactives, 0.05-0.5% by weight of the preservatives, 0.5-3% of the sweeteners, 0.01-0.2% by weight of the colorants, 0.1-1% by weight of the emulsifiers, and 0.1-2% by weight of the stabilizers, wherein the total sum of the embedded substances is effective to provide desired organoleptic properties. As used in this disclosure, an "organoleptic property" is a sensory characteristic of a composition that can be perceived through the senses. In an embodiment, the senses may include taste, smell, texture, and visual appearance. Organoleptic properties may influence the overall consumer experience by enhancing flavor, aroma, mouthfeel, and color. In the context of the disclosed composition, these properties may be adjusted through the selection and concentration of embedded substances such as flavoring agents, sweeteners, colorants, and stabilizers. In an embodiment, the total sum of the embedded substances may be sufficient to provide the desired organoleptic properties when their combined concentration falls within specific ranges. For example, a composition with 3-5% by weight flavoring agents, 1-2% by weight sweeteners, and 0.1-0.3% by weight colorants may be effective in delivering a strong, well-balanced taste and appearance for a fruit-flavored beverage strip. In another embodiment, a formulation containing 2-4% by weight flavoring agents, 0.5-1.5% by weight sweeteners, and 0.1-0.5% by weight emulsifiers may be optimized to provide a smooth and palatable mouthfeel, particularly for compositions with enhanced bioactives or nutrients. In an embodiment, achieving a desired organoleptic profile may depend on balancing the embedded substances in proportions that ensure both perceptible sensory impact and functional stability. For instance, a high-intensity flavor profile may require 4-5% by weight flavoring agents, while a more subtle taste experience may only necessitate 1-2% by weight flavoring agents combined with 0.5-1% by weight emulsifiers to enhance dispersion and mouthfeel. Similarly, compositions designed for visual appeal may require 0.05-0.2% by weight colorants to provide a noticeable but natural hue without overpowering the sensory experience. In an embodiment, the plurality of embedded substances is formulated to balance flavor, nutrition, stability, and dissolution properties, ensuring that the beverage strip 104 delivers a consistent sensory experience when introduced into a liquid medium 108. The specific proportions of the plurality of embedded substances may allow for controlled taste, texture, and visual appeal while maintaining functional integrity within the base matrix layer. For example, without limitation, in an embodiment where the beverage strip 104 is designed for instant tea infusion, the plurality of embedded substances may include approximately 3% by weight of flavoring agents, such as black tea extract and citrus oils, to provide a robust and aromatic infusion. The formulation may also contain 1.5% by weight of nutrients, including vitamin C and polyphenols, contributing to antioxidant benefits. Additionally and or alternatively, the bioactives may be limited to 0.5% by weight, ensuring the presence of herbal adaptogens such as *ginseng* or ashwagandha, without overpowering the natural tea profile. In another embodiment, the beverage strip 104 may be formulated with 2.5% by weight of sweeteners, such as monk fruit extract and erythritol, ensuring a mildly sweet yet refreshing taste. The nutrients, including electrolytes such as sodium and potassium, may be incorporated at 2% by weight, ensuring effective hydration support. The colorants, such as beet juice powder or *spirulina* extract, may be included at 0.05% by weight, providing subtle natural color without artificial dyes. In another embodiment, the beverage strip 104 infused with probiotics and herbal extracts may include 1.2% by weight of bioactives, such as probiotic cultures, turmeric extract, and elderberry concentrate, ensuring immune and digestive health benefits. The formulation may also contain 0.3% by weight of stabilizers, such as pectin and beta-glucans, to support uniform dispersion of functional ingredients when dissolved in kombucha or herbal tea.

With continued reference to FIGS. 1A-1B, the base matrix layer encapsulates the functional layer with the functional layer being embedded within an interior of the base matrix layer. As used in this disclosure, an "interior" is a space within a structure. In an embodiment, the interior is defined by one or more surrounding boundaries that separate it from an exterior environment. The interior may include, but is not limited to, chambers, compartments, cavities, or reservoirs designed to contain, process, or interact with materials, substances, or components. In some embodiments, the interior may be configured to regulate temperature, pressure, humidity, or chemical composition, enabling controlled conditions for storage, reaction, or dissolution. For example, without limitation, in an embodiment where the interior of the base matrix layer encapsulates the functional layer, the functional layer may contain flavoring agents, nutrients, or bioactives that remain protected until dissolution in a liquid medium 108. In an embodiment, and the like, the base matrix layer may be composed of polyvinyl alcohol (PVA), xylitol, carrageenan, ensuring structural integrity while enclosing a functional layer infused with green tea extract, citrus oils, and honey powder. Upon contact with hot water, the base matrix layer may dissolve, releasing the functional layer's embedded substances to create a fully infused beverage. In another embodiment, the interior of the base matrix layer may encapsulate a functional layer containing electrolytes such as sodium, potassium, and magnesium, ensuring that the electrolytes remain stable in a dry state and only disperse when the strip dissolves in sports drinks, coconut water, or infused water. In some embodiments, the base matrix layer serves as an external structural component that encloses and protects the functional layer, ensuring stability in a dry state and controlled release upon dissolution in a liquid medium 108. The functional layer may be positioned within the interior of the base matrix layer and may contain embedded substances such as flavors, nutrients, bioactives, or sweeteners, which are designed to disperse into the liquid once the base matrix layer dissolves. For example, without limitation, in an embodiment where the beverage strip 104 is formulated for instant tea, the base matrix layer may be composed of hydrocolloid-based materials such as agar-agar and carrageenan, allowing the beverage strip 104 to maintain its form while encapsulating a functional layer containing tea extracts, citrus oils, and honey powder. Upon exposure to hot water, the base matrix layer dissolves, releasing the functional layer's embedded substances to create a fully infused beverage. In another embodiment, a functional electrolyte strip may include a base matrix layer composed of polyvinyl alcohol (PVA) and sorbitol, which encapsulates a functional layer containing electrolytes such as potassium, sodium, and magnesium, along with natural fruit flavor extracts. The interior positioning of the functional layer ensures that the electrolytes remain protected from premature degradation and only release when the strip dissolves in a sports drink or water. In another embodiment, the beverage strip 104 may incorporate a base matrix layer made of xylitol and polyethylene glycol (PEG), encapsulating a functional layer enriched with probiotics, prebiotics, and botanical extracts such as turmeric, ginger, and elderberry. Without limitation, the structure may ensure that the probiotics remain stable within the interior of the base matrix layer, preventing moisture exposure and preserving bioactivity until the strip is added to a liquid medium 108 such as kombucha or herbal tea. Continuing, by embedding the functional layer within the interior of the base matrix layer, this configuration enables controlled dissolution, enhanced stability, and optimized ingredient release, making it suitable for various beverage formulations requiring precise delivery of flavors, nutrients, or bioactives.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 2:
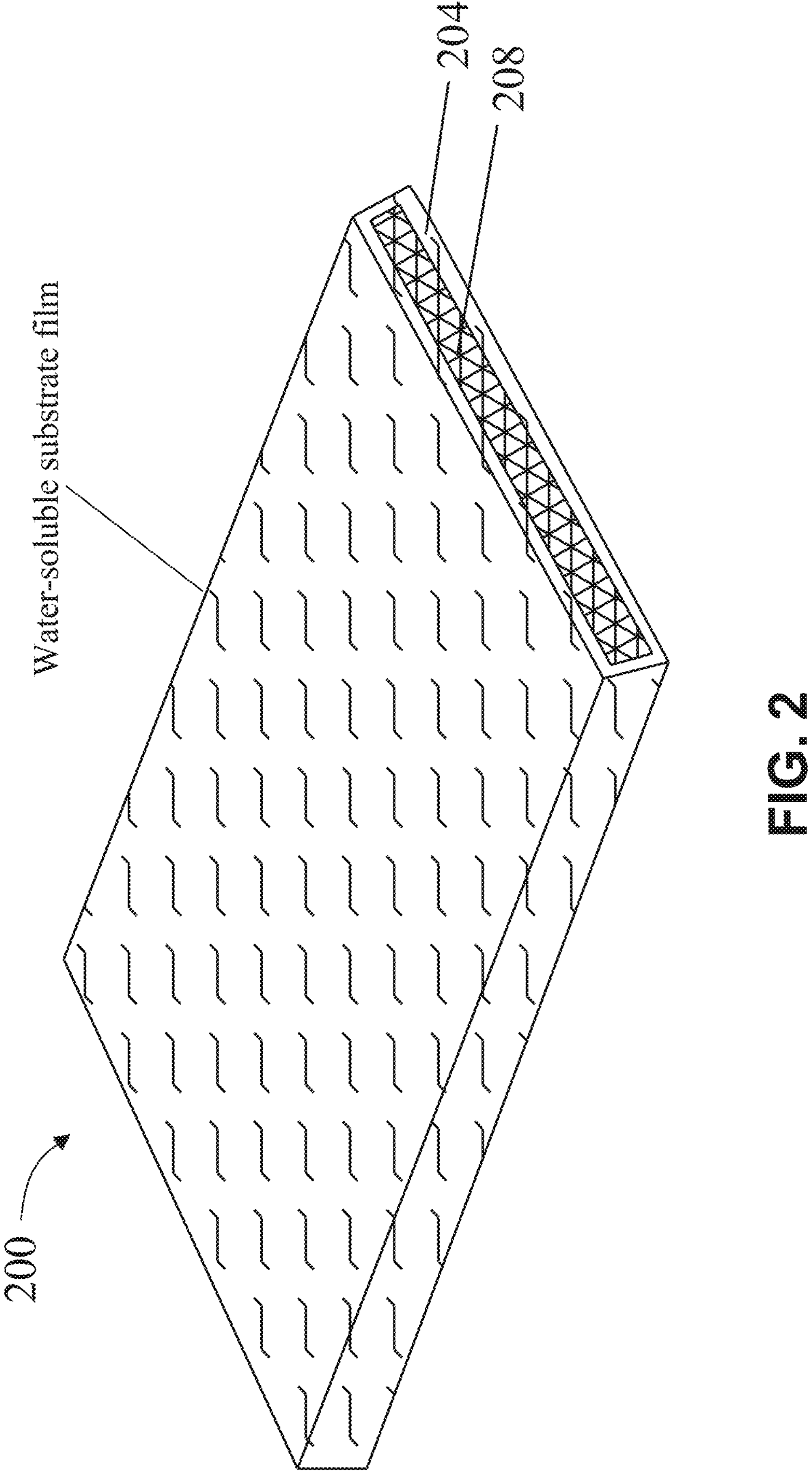
FIG. 2 is an exemplary embodiment of a cross-sectional view of a beverage strip.

Referring now to FIG. 2, an exemplary embodiment of a cross-sectional view of a beverage strip 200. In an embodiment, the beverage strip 200 includes a base matrix layer 204 as described herein. In an embodiment, the beverage strip 200 includes a functional layer 208 as described herein.

Figure 3:
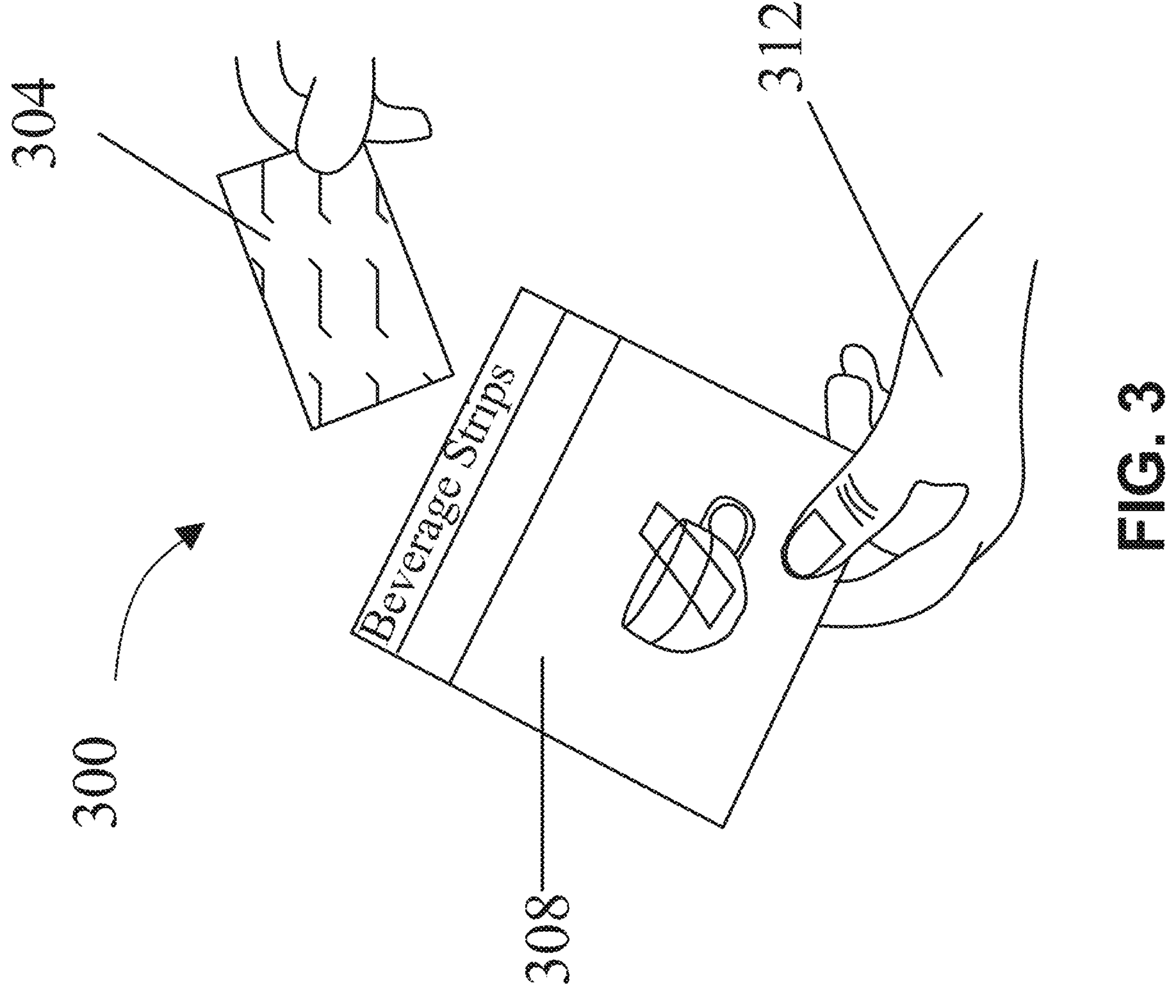
FIG. 3 is an illustration of a beverage strip in a user's hand.

Referring now to FIG. 3, an illustration 300 of a beverage strip in a user's hand. In an embodiment, the illustration 300 may include the beverage strip 304. In an embodiment, the illustration 300 may include a beverage strip packaging 308. As used in this disclosure, "beverage strip packaging" is an enclosure designed to store the beverage strip(s). In an embodiment, the beverage strip packaging 308 may preserve the integrity and stability of the beverage strip 304 until use. The beverage strip packaging 308 may include, but is not limited to, single-use sachets, resealable pouches, blister packs, dispenser boxes, and the like, designed to prevent exposure to moisture, air, or contaminants. For example, without limitation, in an embodiment, the beverage strip packaging 308 may be a resealable foil pouch containing individually wrapped beverage strips, ensuring freshness and easy portability. In another embodiment, beverage strip packaging 308 may include a dispenser box, allowing users to retrieve one strip at a time while maintaining the integrity of unused strips. In another embodiment, beverage strip packaging 308 may include biodegradable film wrapping, enabling environmentally friendly disposal while keeping the beverage strip 304 protected before use. In an embodiment, the illustration may include a user 312. As used in this disclosure, a "user" is an individual who interacts with the beverage strip. In an embodiment, the user 312 may perform actions such as handling, dissolving, or ingesting the beverage strip 304. The user 312 may engage with beverage strip packaging 308, remove the strip, and introduce it into a liquid medium for consumption. For example, without limitation, in an embodiment, user 312 may remove beverage strip 304 from beverage strip packaging 308, place it in a cup of hot tea, and stir to facilitate dissolution. In another embodiment, user 312 may carry individually wrapped beverage strips in a travel pouch and dissolve a strip in cold water while on the go. In yet another embodiment, user 312 may be depicted in illustration 300, demonstrating proper handling, storage, or preparation of the beverage strip 304 for optimal use.

Figure 4:
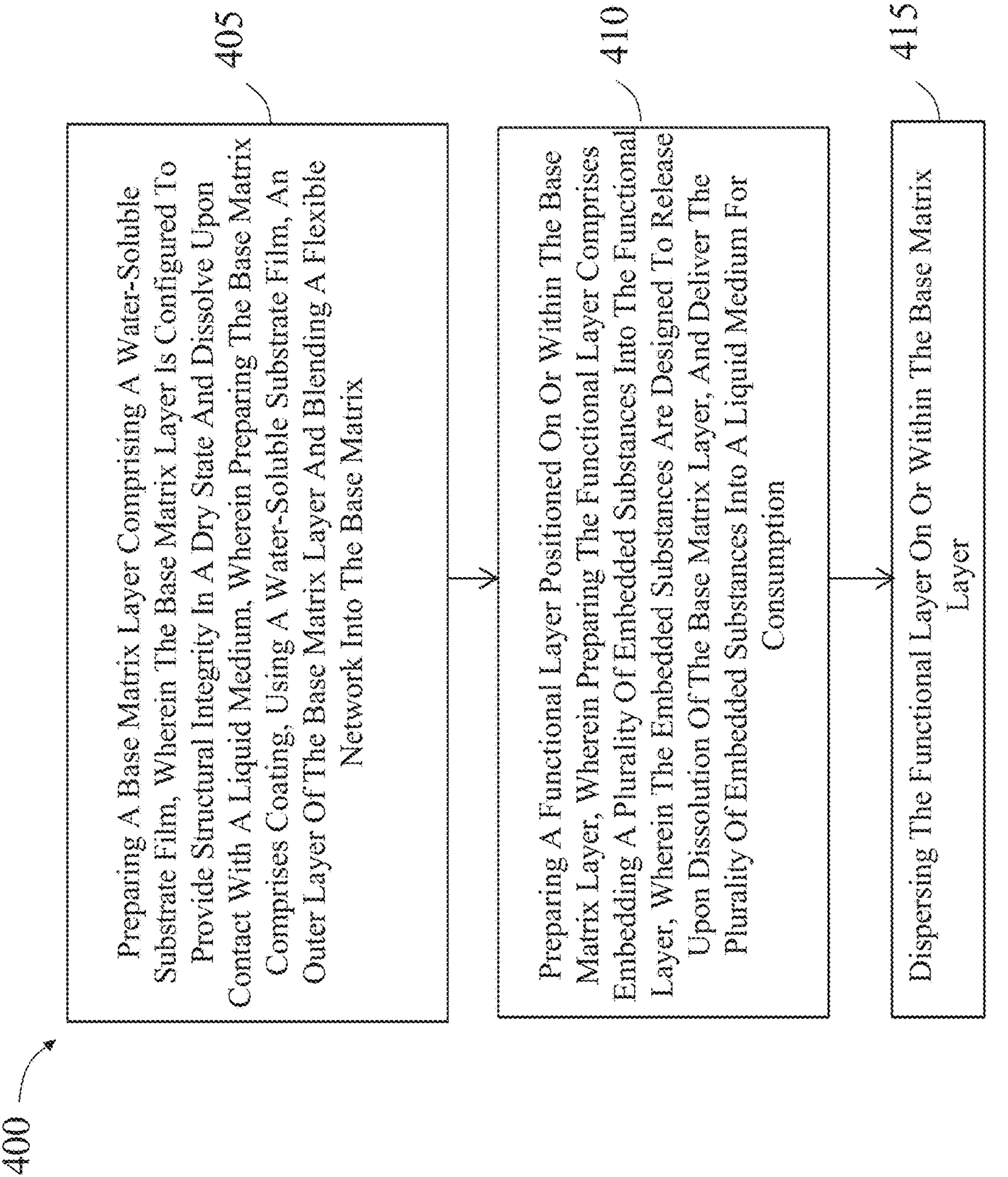
FIG. 4 is a block diagram of an exemplary method of manufacturing a beverage strip.

Referring now to FIG. 4, a flow diagram of an exemplary method 400 for manufacturing a beverage strip is illustrated. At step 405, method 400 includes preparing a base matrix layer comprising a water-soluble substrate film, wherein the base matrix layer is configured to provide structural integrity in a dry state and dissolve upon contact with a liquid medium, wherein preparing the base matrix comprises coating, using a water-soluble substrate film, an outer layer of the base matrix layer and blending a flexible network into the base matrix. The base matrix layer may be prepared using casting, extrusion, or compression molding techniques, ensuring uniform thickness and consistency across the film. In an embodiment, the water-soluble substrate film may be coated onto an outer layer of the base matrix layer using dip coating, spray coating, or roll coating methods, which may enhance the film's stability, improve dissolution control, or encapsulate additional functional ingredients. Without limitation, the blending process may be achieved through high-shear mixing, sonication, or homogenization to ensure uniform distribution of the flexible network within the base matrix. In an embodiment, extrusion-based methods may be used to incorporate the flexible network while simultaneously forming the substrate film, allowing for continuous processing and improved scalability. High-shear mixing is a blending process that applies intense mechanical force to rapidly disperse and mix components within a formulation. High-shear mixing may involve the use of rotor-stator systems, high-speed impellers, or inline mixers to break down agglomerates, reduce particle size, and ensure uniform distribution of ingredients within the base matrix. This process may be used to incorporate polymers, emulsifiers, or active components into the water-soluble substrate film. Sonication is a mixing technique that uses ultrasonic waves to generate high-frequency vibrations, promoting the dispersion and homogenization of components within a liquid or semi-solid medium. Sonication may enhance the dissolution of solid particles, improve molecular interactions, and facilitate the integration of nano- or micro-sized additives into the flexible network. This process may be particularly useful for dispersing bioactive compounds, stabilizers, or hydrophilic polymers into the base matrix. Homogenization is a blending process that applies mechanical pressure or shear forces to create a uniform and stable mixture of components. Homogenization may be achieved using high-pressure homogenizers, colloid mills, or microfluidizers to break down larger particles and create a fine, consistent dispersion. This process may improve the stability, texture, and dissolution properties of the base matrix layer, ensuring that the flexible network is evenly distributed throughout the composition. In another non-limiting example, additional machining techniques may be employed to refine the base matrix structure and optimize its performance characteristics. Without limitation, calendering may be used to achieve a uniform thickness and smooth surface, while precision cutting or laser etching may be applied to create pre-determined shapes or perforations to control dissolution rates. As used in this disclosure, "calendering" is a process in which a material is passed between rollers to achieve a desired thickness, smoothness, or structural integrity. The calendering process may apply pressure, heat, or both to refine the surface properties of the material, enhance uniformity, and control dissolution characteristics. In an embodiment, calendering may be used to ensure that the base matrix layer maintains consistent mechanical properties while remaining flexible and capable of dissolving efficiently upon contact with a liquid medium. In an embodiment, freeze-drying or vacuum drying techniques may be used to enhance the film's porosity, allowing for faster dissolution when exposed to a liquid medium. In an embodiment, the water-soluble substrate film may include a polymeric or hydrocolloid-based film. In an embodiment, the base matrix further may include a flexible network, wherein the flexile network is selected from the group consisting of xylitol, mannitol, polyvinyl alcohol, plasticizers, glycerin, sorbitol, polyethylene glycol, propylene glycol, gellan gum, agar-agar, carrageenan, lecithin, and combinations thereof. In an embodiment, the base matrix layer may include approximately 83.3% to 97.64% by weight of a total composition and the functional layer comprises approximately 2.36% to 16.7% by weight of the total composition. This may be implemented as described and with reference to FIGS. 1-3.

Still referring to FIG. 4, at step 410, method 400 includes preparing a functional layer positioned on or within the base matrix layer, wherein preparing the functional layer comprises embedding a plurality of embedded substances into the functional layer, wherein the embedded substances are designed to release upon dissolution of the base matrix layer, and deliver the plurality of embedded substances into a liquid medium for consumption. Without limitation, the embedding process may involve co-extrusion, solvent casting, spray drying, electrospinning, microencapsulation, impregnation, and the like, depending on the characteristics of the embedded substances and the desired release profile. In an embodiment, co-extrusion may be used to simultaneously form the base matrix and the functional layer, embedding the substances within a multilayered structure during manufacturing. Continuing, this process may allow for controlled layering and precise distribution of active components. In an embodiment, solvent casting may involve dissolving the embedded substances in a liquid medium and depositing them into the functional layer as the solvent evaporates, ensuring homogeneous dispersion within the matrix. In an embodiment, spray drying may be used to convert liquid or semi-solid embedded substances into fine particles before integrating them into the functional layer.

This technique may enhance solubility and facilitate uniform dispersion. Similarly, electrospinning may be employed to create ultrafine fibers containing embedded substances, which can be integrated into the functional layer to enhance dissolution control and bioavailability. In an embodiment, microencapsulation may be used to coat or encapsulate the embedded substances within microscopic protective shells before embedding them in the functional layer. This approach may help stabilize sensitive compounds and enable controlled release upon dissolution of the base matrix layer. Additionally and/or alternatively, impregnation techniques may involve soaking or infusing the functional layer with active components, allowing them to be absorbed into the structure before drying and final processing. In an embodiment, the plurality of embedded substances comprises one or more flavoring agents selected from a group consisting of natural flavors, artificial flavors, essential oils, fruit extracts, spice extracts, herb extracts, vanilla extract, citrus oils, berry flavorings, chocolate flavoring, mint extract, kombucha extract, floral extracts, fermented fruit extracts, coffee cherry extract, coconut water concentrate, matcha powder, roasted barley extract, smoked paprika extract, yuzu zest extract, tamarind concentrate, rosemary extract, ginger extract, lemongrass extract, hibiscus extract, turmeric extract, black tea extract, green tea extract, guava puree, passion fruit concentrate, acai berry powder, elderflower extract, saffron extract, dragon fruit concentrate, pear essence, pomegranate concentrate, coconut extract, lime zest, apple cider vinegar, lemongrass oil, matcha extract, ginger root powder, smoked cinnamon, rose water, beetroot juice concentrate, mango puree, watermelon essence, hibiscus flower extract, cranberry extract, salted caramel flavoring, vanilla bean extract, and any combinations thereof. In an embodiment, plurality of embedded substances may include one or more nutrients selected from a group consisting of vitamins, minerals, amino acids, electrolytes, fiber, antioxidants, proteins, omega-3 fatty acids, carbohydrates, sugars, polyphenols, probiotics, prebiotics, enzymes, astaxanthin, coenzyme q10, curcumin, chlorophyll, hyaluronic acid, l-carnitine, *spirulina*, collagen peptides, turmeric extract, resveratrol, and any combinations thereof. In an embodiment, the plurality of embedded substances may include one or more bioactives selected from a group consisting of vitamins, minerals, amino acids, polyphenols, probiotics, omega-3 fatty acids, caffeine, herbal extracts, antioxidants, plant-based extracts, astaxanthin, spermidine, berberine, pterostilbene, L-theanine, *cordyceps*, saffron extract, corydalis extract, fucoxanthin, N-acetylcystein, GLP-1 receptor agonists, SGLT-2 inhibitors, beta-agonists, peptides, statins, and any combinations thereof. In an embodiment, the plurality of embedded substances may include one or more preservatives selected from a group consisting of sodium benzoate, potassium sorbate, calcium propionate, citric acid, ascorbic acid, tocopherols, rosemary extract, lactic acid, nisin, grapefruit seed extract, elderberry extract, pomegranate extract, annatto extract, ferrous sulfate, natural plant-derived antimicrobials, chitosan, berberine, oregano oil, and any combinations thereof. In an embodiment, the plurality of embedded substances may include one or more sweeteners selected from a group consisting of sucrose, glucose, fructose, high fructose corn syrup, *stevia*, sucralose, aspartame, erythritol, xylitol, agave syrup, monk fruit extract, allulose, tagatose, yacon syrup, lucuma powder, and any combinations thereof. In an embodiment, the plurality of embedded substances may include one or more colorants selected from a group consisting of natural food colorants, artificial food colorants, beet juice powder, *spirulina* extract, turmeric powder, spinach powder, carrot juice powder, anthocyanins, black currant extract, matcha powder, chlorophyll, paprika extract, berry extracts, fruit concentrates, vegetable concentrates, pitaya extract, butterfly pea flower extract, red cabbage extract, moringa powder, hibiscus extract, saffron, black soybean powder, rose petal extract, cocoa powder, indigo powder, maqui berry extract, and any combinations thereof. In an embodiment, the plurality of embedded substances may include one or more emulsifiers selected from a group consisting of lecithin, monoglycerides, diglycerides, polysorbates, sucrose esters, propylene glycol esters, xanthan gum, guar gum, sunflower lecithin, chitosan, acacia gum, milk protein concentrate, tapioca starch, *laminaria* extract, polyglycerol esters of fatty acids, and any combinations thereof. In an embodiment, the plurality of embedded substances may include one or more stabilizers selected from a group consisting of citric acid, ascorbic acid, tocopherols, xanthan gum, guar gum, sodium benzoate, calcium carbonate, pectin, tamarind gum, konjac flour, chitosan, beta-glucans, polydextrose, tannins, alginates, and combinations thereof. In an embodiment, the plurality of embedded substances may include approximately 1-5% by weight of the flavoring agents, 0.5-3% of the nutrients by weight, 0.1-2% by weight of the bioactives, 0.05-0.5% by weight of the preservatives, 0.5-3% by weight of the sweeteners, 0.01-0.2% by weight of the colorants, 0.1-1% by weight of the emulsifiers, and 0.1-2% by weight of the stabilizers, wherein the total sum of the embedded substances is effective to provide desired organoleptic properties. In an embodiment, the base matrix layer encapsulates the functional layer with the functional layer being embedded within an interior of the base matrix layer. This may be implemented as described and with reference to FIGS. 1-3.

Still referring to FIG. 4, at step 415, method 400 includes dispersing the functional layer on or within the base matrix layer. Dispersing may involve uniformly spreading or embedding the functional layer within the base matrix layer to maintain stability, facilitate controlled release, and ensure dissolution upon contact with a liquid medium. In an embodiment, solution casting may be used, where the functional layer is dissolved or suspended in a liquid carrier and spread onto the base matrix layer before drying, allowing for uniform dispersion. In another embodiment, spray coating may involve atomizing the functional layer into fine droplets and applying it evenly across the base matrix layer, ensuring precise coverage and adherence. In an embodiment, lamination may be used, where a pre-formed functional layer is pressed or bonded onto the base matrix layer using pressure, heat, or adhesive agents, ensuring a stable and uniform integration. In another embodiment, extrusion-based dispersion may involve co-extruding the base matrix and functional layer, embedding the functional layer within the matrix or forming distinct layered structures. In an embodiment, impregnation techniques may allow the functional layer to be infused into the base matrix through soaking, vacuum infiltration, or solvent diffusion, ensuring that the embedded substances are well-integrated throughout the structure. Additionally, powder blending methods may involve mixing dry functional layer particles with the base matrix material before film formation, resulting in an evenly dispersed composition. In an embodiment, the method further comprising shaping, using a shaping machine, the beverage strip into a first shape. In an embodiment, without limitation, the shaping machine may be a mechanical or automated device configured to form a beverage strip into a desired geometric structure. The shaping machine may utilize techniques such as die-cutting, stamping, laser cutting, molding, extrusion, and the like to achieve precise and consistent shapes. In an embodiment, the shaping machine may incorporate rollers, cutting dies, or programmable blades to create intricate patterns, allowing for customization based on functional or aesthetic preferences. The shaping machine may also apply controlled pressure, heat, or vacuum forming to refine the edges and surface characteristics of the beverage strip, ensuring uniformity in thickness and dissolution behavior. In an embodiment, the first shape may include the initial geometric configuration of the beverage strip after processing, before any additional modifications or packaging. The first shape may be selected, without limitation, based on dissolution efficiency, user experience, or branding considerations. For example, without limitation, in an embodiment, the beverage strip may be shaped into a square or rectangular form, which may allow for easy stacking, packaging, and uniform dissolution in liquid mediums. In another embodiment, the beverage strip may take on a flat circular shape, optimizing surface area for rapid dispersion in beverages. In an embodiment, the first shape may also be designed for aesthetic appeal or enhanced functionality. The beverage strip may be shaped into a pyramid or star configuration, creating a visually engaging experience while allowing for controlled dissolution from multiple angles. In another embodiment, the beverage strip may be formed into a wave or spiral shape, which may increase the interaction of the strip with liquid, enhancing the rate of dissolution. Additionally and/or alternatively, in an embodiment, the beverage strip may feature hollow center designs or perforations, allowing liquid to flow through the structure for an accelerated release of active components. In an embodiment, the method further comprising heating, using infrared radiation, the beverage strip to a first temperature, the first temperature selected based on an optimal distribution metric of the distribution of the functional layer on or within the base matrix layer. As used in this disclosure, "infrared radiation" is electromagnetic waves with wavelengths longer than visible light but shorter than microwaves. In an embodiment, the infrared radiation wavelength may include a range of 700 nanometers (nm) to 1 millimeter (mm). Infrared radiation may be used as a non-contact heating method, where thermal energy is absorbed by the beverage strip, allowing controlled heating without direct physical contact. In an embodiment, without limitation, infrared radiation may facilitate uniform heating of the beverage strip, ensuring that the functional layer is effectively distributed on or within the base matrix layer without causing degradation or unwanted alterations to the embedded substances. In an embodiment, other heating techniques may be used to heat the beverage strip to a first temperature, ensuring proper distribution of the functional layer on or within the base matrix layer. In an embodiment, without limitation, convection heating may be employed, where heated air circulates around the beverage strip within a controlled oven or drying chamber. This method may provide consistent, indirect heating, allowing for gradual temperature increases that help prevent degradation of heat-sensitive ingredients. In an embodiment, conduction heating may be used, where the beverage strip is placed in direct contact with a heated surface, such as a metal plate or conveyor belt, to transfer heat efficiently. This method may be beneficial for rapid and uniform heating, particularly for thin beverage strips requiring precise thermal control. In an embodiment, radiofrequency (RF) heating may be utilized, where electromagnetic waves in the RF spectrum penetrate the material and generate heat internally. This technique may be advantageous for volumetric heating, ensuring even temperature distribution throughout the base matrix and functional layer. In an embodiment, microwave heating may be applied, where microwave energy excites water molecules within the beverage strip, generating heat from the inside out. This method may offer rapid and selective heating, which may be useful for compositions with varying moisture content. In another embodiment, induction heating may be used, where an electromagnetic field induces heat within a conductive material embedded in or beneath the beverage strip. This technique may allow for precise, localized heating, optimizing ingredient stability and dissolution properties. As used in this disclosure, an "optimal distribution metric" is a measurable criterion used to assess the uniformity and effectiveness of the functional layer's dispersion within or on the base matrix layer. The optimal distribution metric may be determined based on parameters such as layer thickness uniformity, ingredient dispersion homogeneity, dissolution consistency, thermal stability, and the like. In an embodiment, the optimal distribution metric may be evaluated using spectroscopic analysis, imaging techniques, weight distribution tests, or particle dispersion assessments to ensure that the functional layer is evenly spread across the beverage strip. The first temperature may be selected to achieve an optimal balance between layer adhesion, preservation of active ingredients, and dissolution performance, ensuring that the beverage strip functions as intended upon exposure to a liquid medium. In an embodiment, the process may begin by positioning the beverage strip on a conveyor system or within a temperature-controlled chamber equipped with infrared emitters. The infrared radiation may be directed toward the strip, allowing heat energy to be absorbed selectively based on the material composition and thickness of the layers. In an embodiment, the heating parameters, such as wavelength intensity, duration of exposure, and distance from the infrared source, may be adjusted to achieve a targeted first temperature that promotes optimal dispersion of the functional layer without causing thermal degradation. In an embodiment, sensors or imaging systems may be used to monitor the uniformity of heating, ensuring that the functional layer is distributed effectively without unintended aggregation or uneven dissolution properties. The optimal distribution metric may be determined by assessing layer thickness consistency, ingredient dispersion, or dissolution behavior, which may be analyzed using spectroscopic techniques, weight measurements, or microscopic imaging. In an embodiment, the heating process may be followed by a controlled cooling phase to stabilize the matrix structure, preserving the integrity of the embedded substances while maintaining the desired dissolution profile. In an embodiment, the optimal distribution metric is determined based on a function of a composition of the beverage strip, wherein the first temperature is approximately 60° C. to 90° C. Without limitation, the first temperature may be selected within a range of approximately 60° C. to 90° C., based on factors such as ingredient solubility, moisture content, polymer properties, thermal stability of embedded substances, and the like. In an embodiment, the composition of the beverage strip may include water-soluble polymers, flavoring agents, bioactive compounds, sweeteners, emulsifiers, and stabilizers, each of which may have specific temperature tolerances affecting their distribution and release characteristics. For example, without limitation, certain hydrocolloids or film-forming agents may require heating above 60° C. to achieve proper dispersion, while sensitive bioactive compounds may degrade at temperatures exceeding 90° C., necessitating precise thermal control. In an embodiment, the optimal distribution metric may be evaluated by assessing parameters such as layer uniformity, dissolution profile, and adhesion strength after heating. Spectroscopic imaging, weight measurements, or microscopic analysis may be used to determine whether the functional layer is evenly integrated within the base matrix. The selected first temperature within the 60° C. to 90° C. range may be adjusted dynamically based on the specific formulation, ensuring that the beverage strip maintains consistent performance, stability, and rapid dissolution upon contact with a liquid medium. This may be implemented as described and with reference to FIGS. 1-3.

Figure 5:
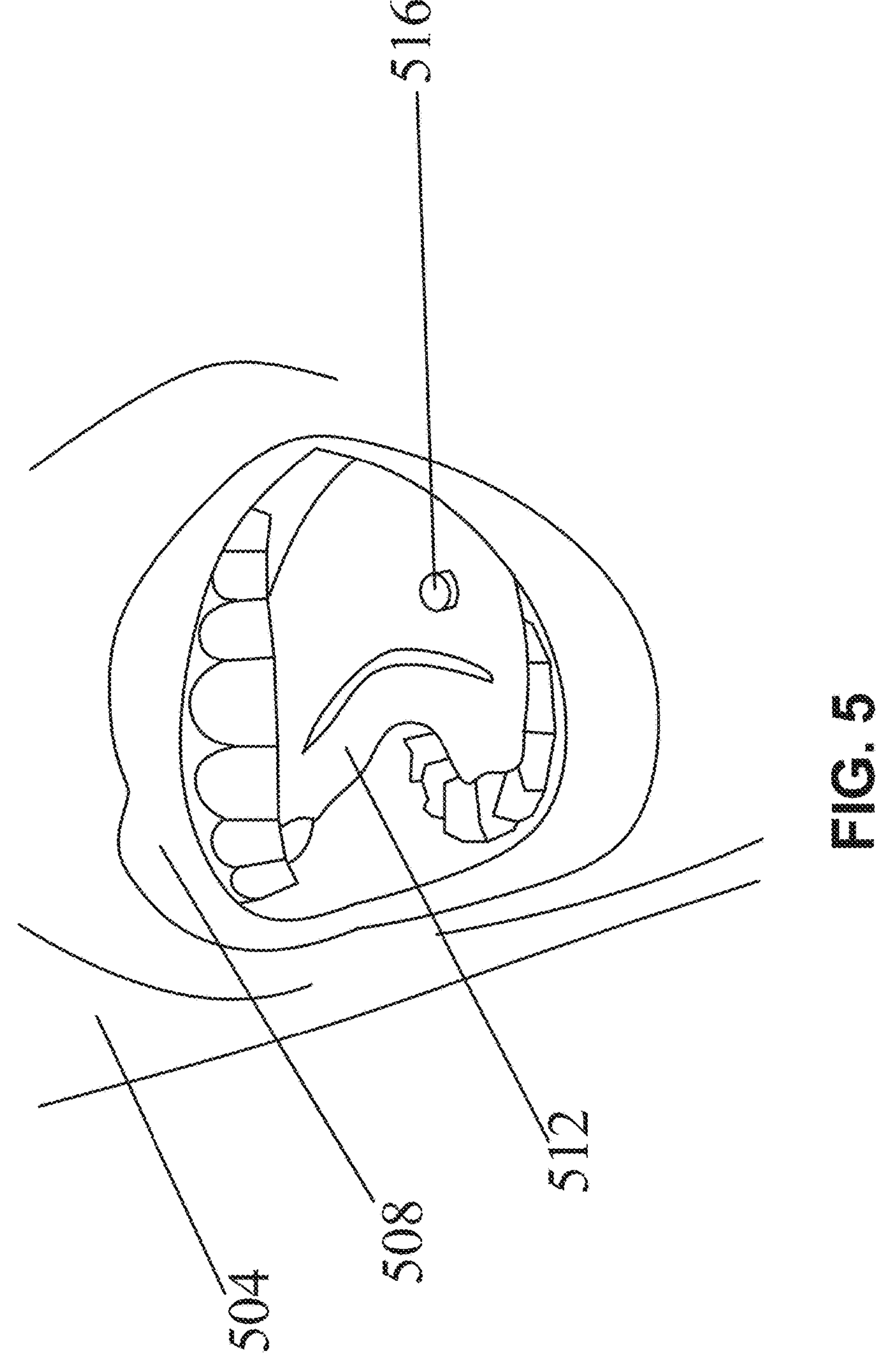
FIG. 5 is an illustration of an exemplary method of using the beverage strip.

Referring now to FIG. 5, an illustration 500 of an exemplary method of using the beverage strip. In an embodiment, the illustration 500 includes a user's face 504. In an embodiment, the user's face 504 includes a mouth 508. In an embodiment, the mouth 508 includes a sublingual area 512. In an embodiment, the sublingual area 512 may receive the beverage strip 516. In an embodiment, the sublingual area 512 may receive the beverage strip 516 to allow for direct placement beneath the tongue for dissolution and absorption. In an embodiment, the beverage strip 516 may be designed to rapidly dissolve upon contact with saliva, enabling efficient delivery of its ingredients. In an embodiment, the sublingual area 512 may facilitate quick absorption of active components into the bloodstream, bypassing the digestive system for faster onset of effects. In an embodiment, the beverage strip 516 may be formulated with flavoring agents, active ingredients, and/or nutritional supplements, as described herein, enhancing both taste and functionality during sublingual administration.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A beverage strip for dissolving in liquid and consumption, wherein the beverage strip comprises:

a base matrix layer and a water-soluble substrate film, wherein the water-soluble substrate film encapsulates the base matrix layer, the base matrix layer configured to:

provide structural integrity in a dry state, wherein the dry state corresponds to the beverage strip remaining solid and structurally intact prior to an exposure to a liquid medium, and dissolve upon contact with the liquid medium;

wherein the water-soluble substrate film comprises a hydrocolloid-based film; and wherein the base matrix further comprises a flexible network, wherein the flexible network is selected from the group consisting of xylitol, mannitol, polyvinyl alcohol, sorbitol, polyethylene glycol, propylene glycol, gellan gum, agar-agar, carrageenan, lecithin, and combinations thereof;

a functional layer positioned on or within the base matrix layer, wherein the functional layer comprises a plurality of embedded substances, wherein the plurality of embedded substances are designed to release upon dissolution of the base matrix layer and deliver the plurality of embedded substances into the liquid medium for consumption; wherein the beverage strip comprises the base matrix layer, the water-soluble substrate film, and the functional layer collectively defining a total composition of the beverage strip.

2. The beverage strip of claim 1, wherein the plurality of embedded substances comprises one or more flavoring agents selected from the group consisting of natural flavors, artificial flavors, essential oils, fruit extracts, spice extracts, herb extracts, vanilla extract, citrus oils, berry flavorings, chocolate flavoring, mint extract, kombucha extract, floral extracts, fermented fruit extracts, coffee cherry extract, coconut water concentrate, matcha powder, roasted barley extract, smoked paprika extract, yuzu zest extract, tamarind concentrate, rosemary extract, ginger extract, lemongrass extract, hibiscus extract, turmeric extract, black tea extract, green tea extract, guava puree, passion fruit concentrate, acai berry powder, elderflower extract, saffron extract, dragon fruit concentrate, pear essence, pomegranate concentrate, coconut extract, lime zest, apple cider vinegar, lemongrass oil, matcha extract, ginger root powder, smoked cinnamon, rose water, beetroot juice concentrate, mango puree, watermelon essence, hibiscus flower extract, cranberry extract, salted caramel flavoring, vanilla bean extract, and any combinations thereof.

3. The beverage strip of claim 1, wherein the plurality of embedded substances comprises one or more nutrients selected from the group consisting of vitamins, minerals, amino acids, electrolytes, fiber, antioxidants, proteins, omega-3 fatty acids, carbohydrates, sugars, polyphenols, probiotics, prebiotics, enzymes, astaxanthin, coenzyme q10, curcumin, chlorophyll, hyaluronic acid, l-carnitine, *spirulina*, collagen peptides, turmeric extract, resveratrol, and any combinations thereof.

4. The beverage strip of claim 1, wherein the plurality of embedded substances comprises one or more bioactives selected from the group consisting of vitamins, minerals, amino acids, polyphenols, probiotics, omega-3 fatty acids, caffeine, herbal extracts, antioxidants, plant-based extracts, astaxanthin, spermidine, berberine, pterostilbene, L-theanine, *cordyceps*, saffron extract, corydalis extract, fucoxanthin, N-acetylcystein, GLP-1 receptor agonists, SGLT-2 inhibitors, beta-agonists, peptides, statins, and any combinations thereof.

5. The beverage strip of claim 1, wherein the plurality of embedded substances comprises one or more preservatives selected from the group consisting of sodium benzoate, potassium sorbate, calcium propionate, citric acid, ascorbic acid, tocopherols, rosemary extract, lactic acid, nisin, grapefruit seed extract, elderberry extract, pomegranate extract, annatto extract, ferrous sulfate, natural plant-derived antimicrobials, chitosan, berberine, oregano oil, and any combinations thereof.

6. The beverage strip of claim 1, wherein the plurality of embedded substances comprises one or more sweeteners selected from the group consisting of sucrose, glucose, fructose, high fructose corn syrup, *stevia*, sucralose, aspartame, erythritol, xylitol, agave syrup, monk fruit extract, allulose, tagatose, yacon syrup, lucuma powder, and any combinations thereof.

7. The beverage strip of claim 1, wherein the plurality of embedded substances comprises one or more colorants selected from the group consisting of natural food colorants, artificial food colorants, beet juice powder, *spirulina* extract, turmeric powder, spinach powder, carrot juice powder, anthocyanins, black currant extract, matcha powder, chlorophyll, paprika extract, berry extracts, fruit concentrates, vegetable concentrates, pitaya extract, butterfly pea flower extract, red cabbage extract, moringa powder, hibiscus extract, saffron, black soybean powder, rose petal extract, cocoa powder, indigo powder, maqui berry extract, and any combinations thereof.

8. The beverage strip of claim 1, wherein the plurality of embedded substances comprises one or more emulsifiers selected from the group consisting of lecithin, monoglycerides, diglycerides, polysorbates, sucrose esters, propylene glycol esters, xanthan gum, guar gum, sunflower lecithin, chitosan, acacia gum, milk protein concentrate, tapioca starch, *laminaria* extract, polyglycerol esters of fatty acids, and any combinations thereof.

9. The beverage strip of claim 1, wherein the plurality of embedded substances comprises one or more stabilizers selected from the group consisting of citric acid, ascorbic acid, tocopherols, xanthan gum, guar gum, sodium benzoate, calcium carbonate, pectin, tamarind gum, konjac flour, chitosan, beta-glucans, polydextrose, tannins, alginates, and combinations thereof.

10. The beverage strip of claim 1, wherein the plurality of embedded substances comprises approximately 1-5% by weight of flavoring agents, 0.5-3% by weight of nutrients, 0.1-2% by weight of bioactives, 0.05-0.5% by weight preservatives, 0.5-3% by weight of sweeteners, 0.01-0.2% by weight of colorants, 0.1-1% by weight of emulsifiers, and 0.1-2% by weight of stabilizers, wherein a total sum of the embedded substances is effective to provide desired organoleptic properties wherein the % by weight is based on the beverage strip.

11. The beverage strip of claim 1, wherein the base matrix layer encapsulates the functional layer with the functional layer being embedded within an interior of the base matrix layer.

12. The beverage strip of claim 1, wherein the base matrix layer comprises approximately 83.3% by weight to 97.64% by weight of the total composition and the functional layer comprises approximately 2.36% to 16.7% by weight of the total composition wherein the % by weight is based on the beverage strip.

13. A method for manufacturing a beverage strip of claim 1, wherein the method comprises:

preparing a base matrix layer and a water-soluble substrate film, wherein the base matrix layer is configured to provide structural integrity in a dry state and dissolve upon contact with a liquid medium, wherein preparing the base matrix comprises:

coating, using a water-soluble substrate film, an outer layer of the base matrix layer; and blending a flexible network into the base matrix;

preparing a functional layer positioned on or within the base matrix layer, wherein preparing the functional layer comprises:

embedding a plurality of embedded substances into the functional layer, wherein the embedded substances are designed to release upon dissolution of the base matrix layer, and deliver the plurality of embedded substances into the liquid medium for consumption; and dispersing the functional layer on or within the base matrix layer.

14. The method of claim 13, further comprising shaping, using a shaping machine, the beverage strip into a first shape.

15. The method of claim 14, further comprising heating, using infrared radiation, the beverage strip to a first temperature, the first temperature selected based on an optimal distribution metric of the distribution of the functional layer on or within the base matrix layer.

16. The method of claim 15, wherein the optimal distribution metric is determined based on a function of a composition of the beverage strip, wherein the first temperature is approximately 60° C. to 90° C.

17. The method of claim 14, wherein the plurality of embedded substances comprises one or more of flavoring agents, nutrients, bioactives, preservatives, sweeteners, colorants, emulsifiers, and stabilizers; wherein the flavoring agents are selected from the group consisting of:

natural flavors, artificial flavors, essential oils, fruit extracts, spice extracts, herb extracts, vanilla extract, citrus oils, berry flavorings, chocolate flavoring, mint extract, kombucha extract, floral extracts, fermented fruit extracts, coffee cherry extract, coconut water concentrate, matcha powder, roasted barley extract, smoked paprika extract, yuzu zest extract, tamarind concentrate, rosemary extract, ginger extract, lemongrass extract, hibiscus extract, turmeric extract, black tea extract, green tea extract, guava puree, passion fruit concentrate, acai berry powder, elderflower extract, saffron extract, dragon fruit concentrate, pear essence, pomegranate concentrate, coconut extract, lime zest, apple cider vinegar, lemongrass oil, matcha extract, ginger root powder, smoked cinnamon, rose water, beetroot juice concentrate, mango puree, watermelon essence, hibiscus flower extract, cranberry extract, salted caramel flavoring, vanilla bean extract, and any combinations thereof, the nutrients are selected from the group consisting of:

vitamins, minerals, amino acids, electrolytes, fiber, antioxidants, proteins, omega-3 fatty acids, carbohydrates, sugars, polyphenols, probiotics, prebiotics, enzymes, astaxanthin, coenzyme q10, curcumin, chlorophyll, hyaluronic acid, l-carnitine, *spirulina*, collagen peptides, turmeric extract, resveratrol, and any combinations thereof, the bioactives are selected from the group consisting of:

vitamins, minerals, amino acids, polyphenols, probiotics, omega-3 fatty acids, caffeine, herbal extracts, antioxidants, plant-based extracts, astaxanthin, spermidine, berberine, pterostilbene, L-theanine, *cordyceps*, saffron extract, corydalis extract, fucoxanthin, N-acetylcystein, GLP-1 receptor agonists, SGLT-2 inhibitors, beta-agonists, peptides, statins, and any combinations thereof, the preservatives are selected from the group consisting of:

sodium benzoate, potassium sorbate, calcium propionate, citric acid, ascorbic acid, tocopherols, rosemary extract, lactic acid, nisin, grapefruit seed extract, elderberry extract, pomegranate extract, annatto extract, ferrous sulfate, natural plant-derived antimicrobials, chitosan, berberine, oregano oil, and any combinations thereof;

the sweeteners are selected from the group consisting of:

sucrose, glucose, fructose, high fructose corn syrup, *stevia*, sucralose, aspartame, erythritol, xylitol, agave syrup, monk fruit extract, allulose, tagatose, yacon syrup, lucuma powder, and any combinations thereof, the colorants are selected from the group consisting of:

natural food colorants, artificial food colorants, beet juice powder, *spirulina* extract, turmeric powder, spinach powder, carrot juice powder, anthocyanins, black currant extract, matcha powder, chlorophyll, paprika extract, berry extracts, fruit concentrates, vegetable concentrates, pitaya extract, butterfly pea flower extract, red cabbage extract, moringa powder, hibiscus extract, saffron, black soybean powder, rose petal extract, cocoa powder, indigo powder, maqui berry extract, and any combinations thereof;

the emulsifiers are selected from the group consisting of:

lecithin, monoglycerides, diglycerides, polysorbates, sucrose esters, propylene glycol esters, xanthan gum, guar gum, sunflower lecithin, chitosan, acacia gum, milk protein concentrate, tapioca starch, *laminaria* extract, polyglycerol esters of fatty acids, and any combinations thereof;

the stabilizers are selected from the group consisting of:

citric acid, ascorbic acid, tocopherols, xanthan gum, guar gum, sodium benzoate, calcium carbonate, pectin, tamarind gum, kojac flour, chitosan, beta-glucans, polydextrose, tannins, alginates, and combinations thereof; and the plurality of embedded substances comprises approximately:

1-5% by weight of the flavoring agents, 0.5-3% by weight of the nutrients, 0.1-2% by weight of the bioactives, 0.05-0.5% by weight of the preservatives, 0.5-3% by weight of the sweeteners, 0.01-0.2% by weight of the colorants, 0.1-1% by weight of the emulsifiers, and 0.1-2% by weight of the stabilizers, wherein a total sum of the embedded substances is effective to provide desired organoleptic properties.

* * * * *